United States Patent [19]
Roller et al.

[11] 3,796,874
[45] Mar. 12, 1974

[54] NON-DESTRUCTIVE ECCENTRICITY AND INSULATION THICKNESS MEASUREMENT SYSTEM

[75] Inventors: Robert F. Roller, McMurray; Robert R. Ferber, Pittsburgh; Wallace D. Loftus, Clairton, all of Pa.

[73] Assignee: Westinghouse Electric Corporation, Pittsburgh, Pa.

[22] Filed: Aug. 18, 1971

[21] Appl. No.: 172,672

[52] U.S. Cl. .................... 250/363, 250/369
[51] Int. Cl. .......................... G01n 23/20
[58] Field of Search... 250/90, 52, 83.3 D, 219 WD, 250/219 TH, 51.5, 53, 83.3 A, 91, 92, 71.5 S, 234, 235, 236, 218

[56] References Cited
UNITED STATES PATENTS

| | | | |
|---|---|---|---|
| 2,922,887 | 1/1960 | Jacobs | 250/52 |
| 3,033,991 | 5/1962 | Sampson | 250/219 WD |
| 3,254,226 | 5/1966 | Bobula | 250/219 WD |
| 2,980,800 | 4/1961 | Steen | 250/90 |
| 3,655,979 | 4/1972 | Vernigan | 250/52 |
| 3,222,979 | 12/1965 | Webster | 250/83.3 D |
| 2,298,942 | 10/1942 | Hicks | 250/52 |
| 3,027,457 | 3/1962 | Mouly | 250/83.3 D |
| 3,080,479 | 3/1963 | Berg | 250/83.3 D |
| 3,146,350 | 8/1964 | Topfer | 250/83.3 D |
| 3,508,035 | 4/1970 | Worthley | 250/83.3 D |

Primary Examiner—James W. Lawrence
Assistant Examiner—D. C. Nelms
Attorney, Agent, or Firm—Daniel C. Abeles

[57] ABSTRACT

A non-destructive insulated cable insulation thickness and eccentricity gaging system is disclosed herein which utilizes X-rays and one dimensional X-ray imaging combined with a digital data processing and readout system to determine the insulation thickness of the cross section of a cable from two orthogonal directions; displays the relative thickness on an electronic readout display for use by the operator in removing eccentricity manually; provides a numerical display of the upper insulation thickness, lower insulation thickness, left insulation thickness, right insulation thickness, average measured insulation thickness, or cable outside diameter on command, or at prescribed intervals under operator or automatic sequence control; and provides an adjustable means for detecting a "high lay" in a cable. This system can be installed on insulated cable production lines to enable rapid process correction and control capability on the insulation extrusion process.

24 Claims, 12 Drawing Figures

NON-DESTRUCTIVE ECCENTRICITY AND INSULATION THICKNESS MEASUREMENT SYSTEM

BACKGROUND OF THE INVENTION

This invention pertains in general to non-destructive eccentricity and insulation thickness measuring systems and more particularly to such systems that utilize X-rays and one dimensional X-ray imaging techniques.

The electrical cable industry produces a large quantity of high quality coated cables, for example plastic coated aluminum cable. For the most part, these cables are multi-strand, multi-layer wrapped conductors. The coating may be a polymer plastic which may be extruded onto the metal by dies at a rate of up to 1500 feet per minute. Two types of coatings are generally used; thermoplastic and thermal-setting. In the thermoplastic process, the coated cable travels from an extruder directly into a cooling bath, where it is cooled, then dried and coiled. The thermal-setting coating process requires that the polymer be cured in a pressurized steam environment after extrusion and prior to cooling, drying and coiling.

The plastic coating materials are extremely expensive, especially in the thermo-setting process. Since insulation eccentricity cannot be detected visually during the coating process, extra thicknesses of insulation have been added in the past to ensure that the insulation never falls below the standard set by the National Electric Code. This added coating thickness increases the cost of such cable. A great savings will result if cable insulation eccentricity can be determined and controlled at the extruder (either manually or automatically).

Thus, it is an objective of this invention to provide a non-destructive technique for insulated cable eccentricity and coating thickness determinations.

It is a further object of this invention to provide such a measurement that can be made "on line" as near as possible to the insulation extrusion head so as to minimize process correction time and ultimately allow closed loop system operation.

The only method presently available for making coating thickness and eccentricity determinations involves taking cable samples at the beginning and end of each reel and measuring the coating mechanically. Thus, if an error in the extrusion head adjustment has produced an out of tolerance condition, a mile or more of cable can be produced before the defect is observed. It may then take several tries before the extrusion head is properly aligned, thereby wasting an additional thousand feet or more of cable for each test run. Moreover, the present techniques are unable to detect the occasional "high lay" which results in a thin spot in the cable insulation.

SUMMARY OF THE INVENTION

This invention achieves the aforementioned objectives by providing a non-destructive insulated cable insulation thickness and eccentricity gaging system which utilizes X-rays and one dimensional X-ray imaging techniques combined with a digital processing and readout system which can be installed on insulated cable production lines to enable rapid process corrections and control capability on the insulation extrusion process.

In accordance with this invention, the cable is bombarded with X-rays and scanned on its opposite side perpendicular to the cable travel. The X-rays impinge on a detector, permitting the output to be read electronically. Where no cable or insulation interferes with the beam, the full intensity of the X-rays are seen by the imaging detector and the electronics. As the insulation begins to interrupt the beam of X-rays, an abrupt change in the amount of received X-rays is noted. A further decrease may be observed as the X-rays penetrate larger and larger insulation thicknesses, then decreasing to a very low level as the metallic portion of the cable itself interferes with the beam of X-rays. The scanning is performed at a fixed rate, so that the time from the first abrupt change in received X-ray level to the blotting out of the beam represents the side cable insulation thickness. As scanning proceeds, eventually the metal of the cable is passed, and an abrupt increase in the received X-ray level is detected. Finally, the detected X-ray level returns to its initial value, indicating that the metal portion of cable has been scanned. Comparison of the two partial penetrant times provides information on eccentricity in one dimension. A second scanning unit may be positioned 90° from the first to provide two dimensional information on insulation thickness.

The eccentricity gage of this invention, using X-ray imaging and digital readout system techniques for on line operation, in an industrial environment, can be constructed to: determine the insulation thickness of the cross section of the cable from two orthogonal directions; display the relative thicknesses of an electronic readout display for use by the operator in removing eccentricity manually; provide a numerical display of the upper insulation thickness, lower insulation thickness, left insulation thickness, right insulation thickness, average measured insulation thickness, or cable outside diameter, on command or at prescribed intervals, under operator or automatic sequence control; and provide an adjustable means for detecting a "high lay" in the cable.

The apparatus thus described basically comprises the X-ray source, the scanning system, the detector and the readout electronics.

The X-ray source is mounted at a distance from the cable center and radiates a beam of X-rays directly towards the cable, desirably from a narrow slit X-ray target, with the long dimension of the slit parallel with the cable axis. Ideally, to prohibit some size multiplication of the image, all rays ought to be parallel. However, because of the geometry of the scanning system, such a result is impossible. The best approximation to prevent fringing and minimize magnification is accomplished by using a beam that is fairly narrow in the scanning direction and located at some distance from the cable. The error that does result is a geometrical error which can be compensated for electronically in the electronics readout package.

A scanning device contemplated by this invention is a one dimensional mechanical scanning detector. The detector system basically may comprise a rotating drum or disc having slits or openings through which the X-rays may pass to a suitable detector such as a photomultiplier tube to which a scintillation crystal has been attached. The drum or disc rotates in a direction that provides scans in a direction traverse to the direction of cable travel. The scan rate or number of scans per unit length is determined by the drum or disc speed, number of slits, and the cable or inspected material velocity. The drum used in the exemplary embodiment illustrated herein contains six slits on the drum face so that six scans are performed in each revolution. Two drums are used in this example to achieve two dimensional resolution and are driven by a single synchronous motor using a single cogged timing belt. The scan slits in the second drum are desirably positioned so that scanning is not performed on the two axes simultaneously. This greatly simplifies the readout electronics for some applications, such as those not requiring a computer in the readout electronics. Two methods of timing are feasible: The synchronous motor excitation can be derived from the clock frequency located in the electronics readout, or the clock may be synchronized to the line frequency if the line frequency is substantially constant at the area of application.

The detector in this example may be a sodium iodide scintillation crystal, doped with thallium. The scintillation crystal is optically coupled to a photomultiplier, which is mounted inside the scanning drum and intercepts X-rays coming through the slits. The crystal is attached directly to the photomultiplier tube face plate, so that the coupling efficiency approaches 100 percent.

alternate exemplary embodiments are provided that illustrate linear scanner-detector units that may be employed with this invention that do not require corrections for any geometrical scanning errors.

Because of the conductor wrapping of most cables to be measured, definite high and low points exist in the cable insulation thickness. These cable lay variations may be averaged out in the readout electronics by integrating (digitally) over a number of scans and dividing the result by the number of scans. Simultaneously, the non-integrated signal is used to detect "high lays" or strands. "High lays" are abnormal peaks in the conductor wrapping which reduce the insulation thickness below tolerable limits. The electronics readout package provided in accordance with this invention provides information as to the several insulation thicknesses referred to above. Furthermore, the readout electronics package provides an indication when the cable outside diameter is larger than a predetermined value, when the minimum insulation thickness is smaller than a predetermined value and when there is a high cable strand ("high lay").

Thus in accordance with this invention, a non-destructive insulated cable insulation thickness and eccentricity gaging system using X-rays and one dimensional X-ray imaging combined with a digital data processing and readout system is provided which can be installed on insulated cable production lines to enable rapid process correction and control capability on the insulation extrusion process.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

In accordance with this invention a non-destructive insulated cable insulation thickness and eccentricity gaging system is described herein which utilizes X-rays and one dimensional X-ray imaging techniques combined with a digital processing and read-out system which can be installed on insulated cable production lines to enable rapid process corrections and control capability on the insulation extrusion process.

Figure 1:
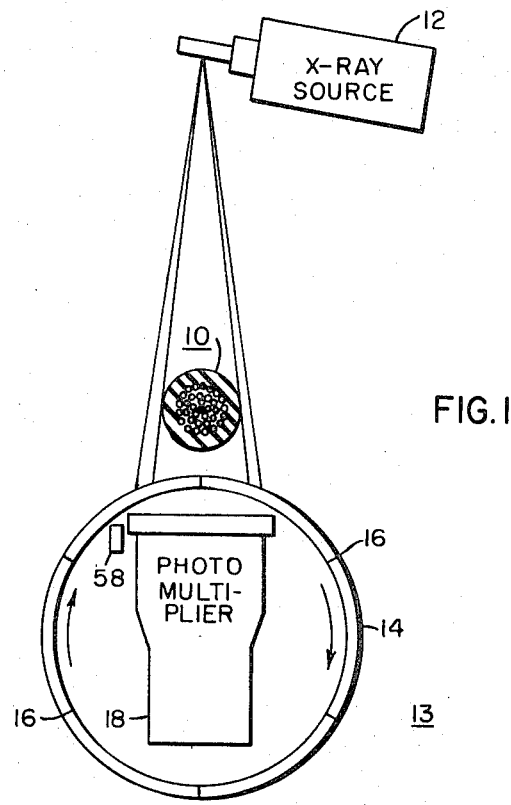
FIG. 1 is a schematic diagram illustrating one embodiment of this invention for measuring eccentricity in one dimension.

As illustrated in FIG. 1 a cable 10 is bombarded with X-rays from an X-ray source 12 and scanned on the side opposite the X-ray source, perpendicular to the cable travel. The scanner illustrated in FIG. 1, exemplary of this invention, is indicated by reference character 13 and comprises a rotating drum 14 having equidistantly spaced slits 16 positioned around the circumference. The drum 14 is rotated by suitable means (not shown) on an axis which is parallel to the axis of cable travel so that the slits 16 scan the underside of the cable 10 perpendicular to its travel direction. A detector such as photomultiplier 18 is provided within the drum 14 to intercept the X-rays passing through the cable 10 and slits 16 as the slits 16 scan the underside of the cable 10. The X-rays impinging on the detector 18 are converted into an electrical signal and fed to an electronics readout package, to be described hereinafter. Where no cable or insulation interferes with the X-ray beam, the full intensity of the X-rays are seen by the imaging detector 18 and the electronics readout, as can be observed from the graphical representation illustrated in FIG. 2. As the insulation 20 of the cable 10 begins to interrupt the beam of X-rays, an abrupt change in the amount of received X-rays is noted as illustrated by abscissa 22 in FIG. 2. A further decrease can be noted as the X-rays penetrate larger and larger insulation 20 thicknesses, then decreasing to a very low level as the metallic conductor 24, itself, interferes with the beam of X-rays as indicated by abscissa 26. If the scanning is performed at a fixed rate, the time from the first abrupt change of received X-ray level, as indicated by the length of the abscissa at coordinate 22, to the blotting out of the beam, as indicated by length of the abscissa at coordinate 26, represents the left side cable insulation thickness. As scanning proceeds, eventually the conductor 24 is passed, and an abrupt increase in the received X-ray level is detected as indicated by the abscissa length at coordinate 28. Finally, the detected X-ray level returns to its maximum value as indicated by the abscissa length at coordinate 30, indicating that the cable 10 has been completely scanned. The signal falls to zero at abscissa 33, indicating that the slit has passed out of the X-ray beam. Comparison of the two partial penetrant times, i.e., the times represented by the distances on the abscissa between coordinates 22 and 26, and between coordinates 28 and 30, provides information on eccentricity in one dimension. A second scanning unit can be positioned 90° from the first, as will be described hereinafter, to provide two dimensional information on insulation thickness.

The system thus described basically comprises the X-ray source 12, the scanning system 13, the detector 18, and the readout electronics.

Figure 2:
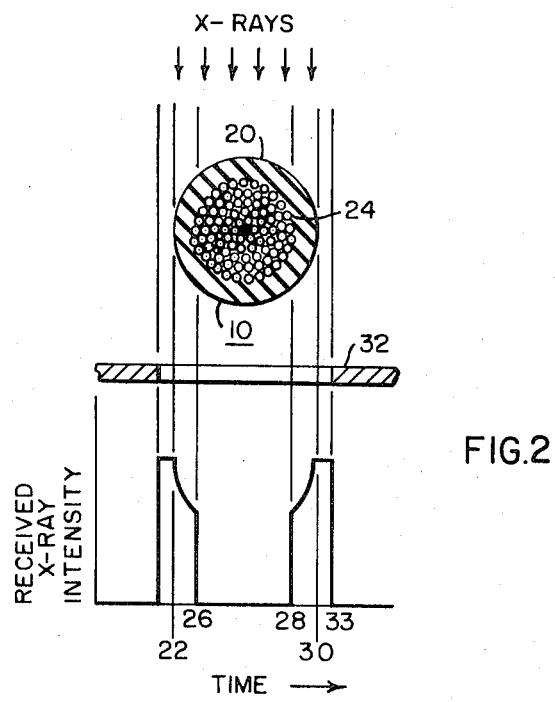
FIG. 2 is a schematic graphical illustration of the X-ray waveform observed by the detector of this invention.

The X-ray source 12 is mounted at a distance from the cable 10 center and radiates a beam of X-rays directly towards the cable 10 from a narrow slit X-ray target, with the long dimension of the slit parallel with the cable 10 axis. A narrow beam X-ray source with a line focal area is utilized. The X-ray beam coverage, in this illustrative embodiment, is desirably 6° from the central ray, which permits study of a 3 inch wide area at a cable distance of 15 inches. Tube excitation is generated from a direct current source, and tube voltage and current are designed to be independently adjustable for maximum versatility. An exemplary X-ray source, which is suitable for this application, is the Machlett 02-L defraction tube manufactured by Machlett Laboratories. The unit is contained within a shock-proof-housing, filled with a specially processed insulating oil and hermetically sealed. This type enclosure is particularly suited to on-line applications in which moisture and dust conditions are usually severe. The defraction tube, thus described, has a narrow X-ray source and a line focal area, producing a 0.2 millimeter by eight millimeter linear focal spot. A tungsten target can be employed to provide radiation wavelengths suitable for the gaging of aluminum cable, though it should be understood that the X-ray target material can vary to conform to the conductor material forming the cable. Further effective collimation of the X-ray beam is obtained by masking at the detector using sheet lead or copper as illustrated in FIG. 2 by reference character 32.

Ideally, to prohibit some size multiplication of the image to be detected, all rays ought to be parallel. However, because of the geometry of the scanning system illustrated in this embodiment, such parallelism is impossible. The best approximation to minimize fringing and magnification is accomplished by using an X-ray beam that is fairly narrow in the scanning direction and located at some distance from the cable, as described above. The size multiplication error that does result from the drum curvature is a geometrical error which can be compensated for electronically in the electronics readout package, to be described.

Figure 3:
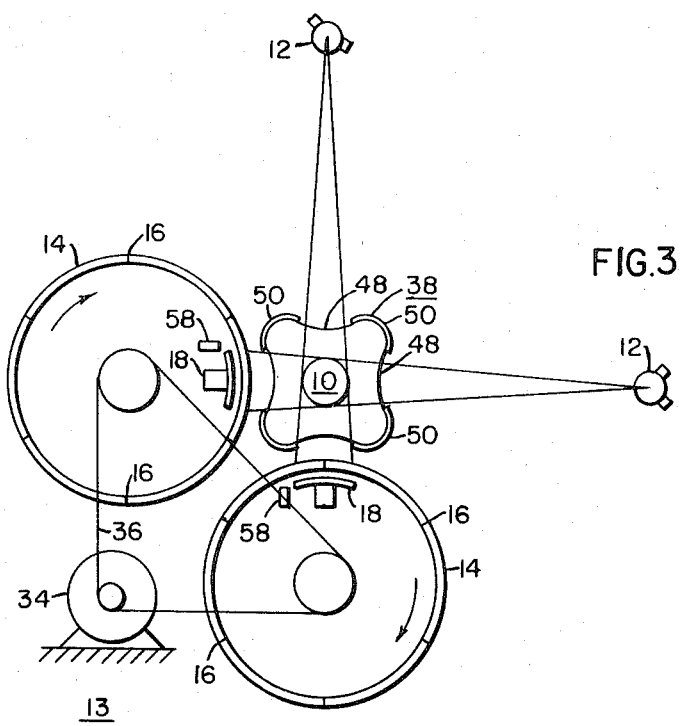
FIG. 3 is a schematic diagram illustrating another embodiment of this invention for measuring eccentricity in two dimensions.

The scanning device illustrated as exemplary of this invention is basically a one dimensional mechanical scanning detector and comprises a rotating drum 14 with slits or openings 16 on the drum face through which the X-rays can pass to a detector 18. The drum 14 rotates to provide scans in a direction transverse to that of the cable 10 travel. The scan rate or number of scans per unit length is determined by the drum speed, the number of slits 16 and the cable or inspected material velocity. The drum is shown having six slits so that six scans are performed each drum revolution. Two drums 14 can be used achieve two dimensional resolution, as illustrated in FIG. 3. The two drums 14 can be driven by a single synchronous motor 34 employing a single cogged timing belt 36. The scanning slits 16 in the second drum 14 are desirably positioned so that scanning is not performed on the two axes simultaneously. This greatly simplifies the readout electronics in cases where a computer is not employed to process the output information.

The drum 14 serves to block the X-ray beam from the detector 18 except during passage of one of the six slots 16 beneath the cable 10. Thus, the drum 14, which is driven at a constant speed, translates the signal received by the detector 18 into a time signal, as illustrated by the graph in FIG. 2. An important consideration with respect to drum 14 geometry is the elemental resolution obtained; scan linearity is considered secondary since its affects can be compensated for electronically. Type 304 stainless steel is specifically suitable for construction of the drum due to its X-ray attenuation characteristics, and inherent corrosion resistance. Other materials with adequate X-ray attenuation characteristics can also be used. Whereas six slits were chosen for this exemplary embodiment, the number of slits will depend upon the desired resolution and scan rate.

The motor illustrated by reference character 34 is desirably a constant speed motor, such as a 600 rpm hysteresis synchronous unit having a wound stator and a high permeability rotor. Design of the motor is such that noise and vibration production is inherently low, with a uniform torque being provided as a function of angle of rotation. The starting torque of the exemplary motor 34 illustrated herein, constant throughout the 360° rotor position, is 33.6 inch-ounces and the rated torque for the motor is 28 inch-ounces. The required drum drive running torque is of the order of 10 inch-ounces, thus this motor choice is quite conservative. When operated with a constant high inertia load, such as the scanning drum 14, the stability is as good as can be obtained with heavily damped designs. Thus, any motor capable of driving the scanning drum at a constant speed can be used.

The recommended slit 16 width is 10 mils, however, it can be shown mathematically that the slit width is (within limits) non-critical except that each slit 16 should have a similar width. If all the slits 16 are not closely alike, the trigger levels in the readout electronics will vary over a wide range. As will be explained later, it may be desirable to average the signal obtained from ten or more slits. Unless an integral number of revolutions are used, a single slit may average more or less times than its neighbor. For this reason, with a six slit drum, averaging over two revolutions is recommended.

Figure 4:
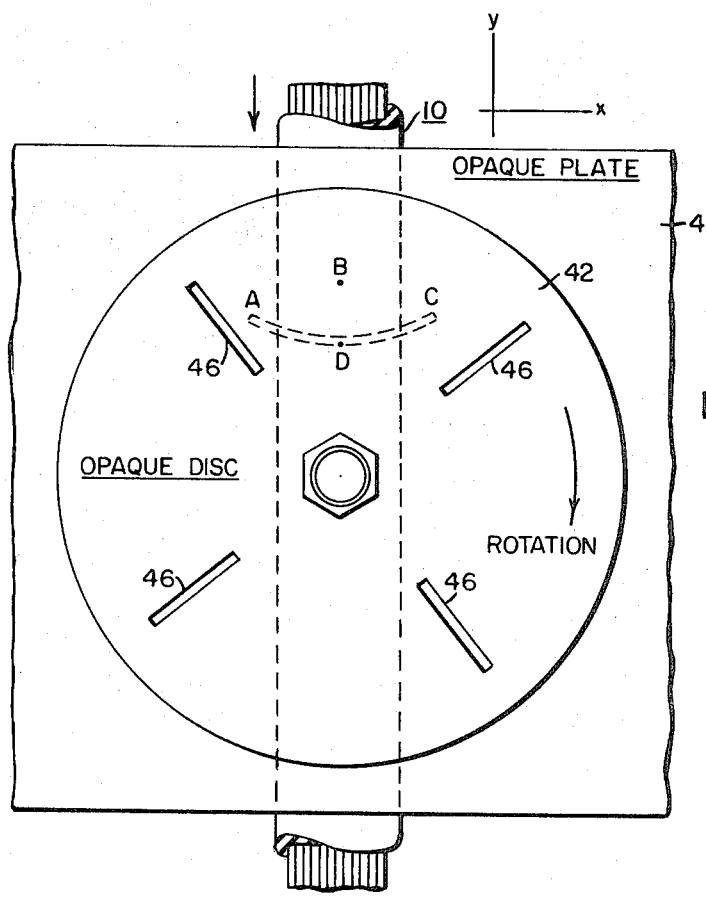
FIG. 4 is a schematic diagram of an alternate embodiment of the detector illustrated in FIGS. 1 and 3.

While the scanning unit 14 of this embodiment has been described as a rotating drum, other scanning configurations can be employed. An example of an alternate scanner is illustrated in FIG. 4 and comprises an X-ray opaque revolving disc 42 and an opaque stationary plate 44. In this figure, the gaged cable 10 is shown passing under an X-ray opaque plate 44 with curved scan slit ADC. An X-ray opaque disc 42 with four radial scan slits 46 is rotably mounted above the plate 44. The X-ray source desirable is desirably positioned directly under the cable, (at some distance from the cable) and the photomultiplier and scintillation crystal are centered over the scan slit ADC. The disc 42 is rotated at a constant speed during operation similar to the drum 14.

In the configuration illustrated the radial slit 46, in the rotating disc 42, is shown about to cut across the curved slit ADC in the stationary plate 44. As the radial slit 46 moves across ADC, ADC, X-rays will pass through the opening common to both slits 46 and ADC. In this manner, successive elements of the cable 10 cross-section will be scanned. The distance between cable scans is thus determined by the disc 42 speed, the number of axial slits 46, and the cable 10 linear velocity. Now, assume that the cable 10 is scanned through a pinhole that followed arc ABC. At every point of scan, except at B, the scan spot velocity vector has a vertical (y) component that varies according to the cosine of the scanned angle. This nonlinearity can be eliminated by scanning across arc ADC, where the curvature of ADC is equal and opposite to (opposite being defined as the mirror image of) the curvature of ABC the two curves intersect at both A and C, defined as the scan boundaries. If this criteria is met, the vertical components of the scan spot velocity vector will be subtracted at every instant, and the scan velocity will be linear. Thus, this system has the advantage of providing a completely linear scan, however, since the sensitive (open) area is in the order of the slit 46 width squared, the sensitivity will normally be two or three orders of magnitude less than that of the drum 14, where the total open scan area is of the order of 10 mils × 1 inch.

During a conventional cable extrusion process, the steam environment, which exits from the extruder head to the end of the catenary curing tube, heats the insulation to cure it causing cross-linking of the insulation (polymerization). A maximum temperature of 450°F and a pressure of 400 psi are usually employed. Because of the closed nature of this environment, it is advisable to enclose the cable 10 with a jacket or window made of an X-ray transparent materal. Additionally, care must be given to the gage mounting, detector X-ray tube cooling, and to the protective envelope surrounding the gage. An exemplary steam jacket is illustrated by reference character 38 in FIG. 3. Ideally, the steam jacket windows 48 should be opaque to the steam and transparent ("there" to) the X-ray beam. This is approached for the jacket windows 48 by optimizing on minimum necessary thickness for strength, thereby providing maximum X-ray beam transmission in the 20 to 50 KV range. In order to achieve maximum transmission, the material used should desirably have a low interaction cross-section to X-rays. Beryllium is one material which exhibits these characteristics and can desirably be used for such an application. Other examples of materials which can be employed are aluminum, boron and graphite. Furthermore, a chromate-anodizing technique can be used to coat and protect the entire beryllium window from steam corrosion. ASA flanges are illustrated for the jacket terminations 50. ASA flanges permit easy replacement or removal of the jacket assembly 38 while permitting, initially, the smallest amount of modification to the existing extrusion process. The flange used in this embodiment as exemplary of this invention is a number 8.00-300 ASA flange - 304 stainless steel. Of course, other jackets that produce negligible X-ray attenuation can be used.

The exemplary detector 18 of this invention is a sodium iodide scintillation crystal, doped with thallium. The scintillation crystal is optically coupled to a photomultiplier, which is mounted inside the scanning drum 14 and intercepts X-rays coming through the slits 16. The crystal is attached directly to the photomultiplier tube face plate, so that the coupling efficiency approaches 100 percent. The exemplary unit illustrated in this embodiment comprises a 3 inch diameter one-fourth inch thick sodium iodide crystal, optically coupled as hereinbefore described to a photo-multiplier tube. The sodium iodide crystal, thus described, gives a high energy conversion efficiency for 5–50 KV X-rays. The decay time ($2.5 \times 10^{-7}$ sec) is very small compared to the time required to scan 1 mil ($3.3 \times 10^{-6}$ sec) of cable at a drum speed of 600 rpm. The sodium iodide crystal emission spectrum is centered at 4,100 Angstroms, with half intensity about ± 850 Angstroms from the mean. This spectrum is well matched to the photomultiplier response, and gives a conversion efficiency of 4.4. percent. A Harshaw Chemical Company type 12S HA1/3HX detector, which uses a three inch magnetically shielded photomultiplier tube with venetian-blind dynodes, desirably is used for this application. This unit features excellent photo-electron collection from all parts of the photocathode, very low dark current, and high cathode sensitivity in the blue and near ultraviolet region of the spectrum. In addition, the detector assembly is relatively insensitive to the effects of extraneous magnetic fields, making the entire unit particularly suited for the gaging application. The crystal and detector package 18 of this exemplary embodiment includes a 1 millimeter aluminum X-ray window mounted over the sodium iodide crystal. which makes the detector insensitive to ordinary light. Covering the 1 millimeter aluminum disc is a heat sinking mask 32, which can be constructed out of copper or lead, exposing the central area of the aluminum disc. The mask 32, illustrated in FIG. 2, can be desirably shaped to provide correction for angular deviation of the drum slit 16 from its center-of-scan position.

The output signal, from each of the detectors 18, has been described hereinbefore with reference to FIG. 2. A Fourier analysis of the detector output reveals that very little information content exists at frequencies greater than about 15 kilohertz. Thus, the electronic readout system bandpass should be desirably adjusted for a high frequency cutoff in the 10 to 20 kilohertz range to minimize X-ray and electronic noise fluctuations.

Figure 12:
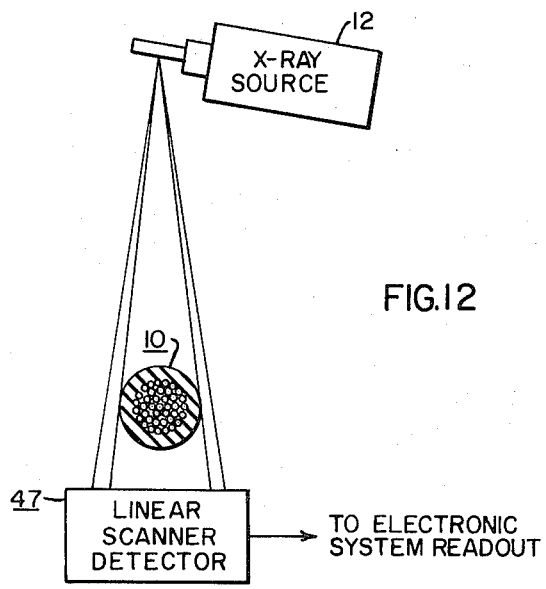
FIG. 12 is a schematic diagram to an alternate embodiment of the detector and scanner of FIGS. 1, 3 and 4.

The mechanical X-ray scanner 13 and detector 18 may be replaced by the linear scanner detector unit 47 illustrated in FIG. 12. The linear scanner detector 47 can either be an X-ray sensitive television tube, such as the Westinghouse Vidicon tube, or a photodiode array. The linear diode arrays have all the necessary scanning logic circuitry on the same chip as the diodes, so the only lead connections are a scanning input or start signal, a clock drive signal which is derived from the electronic readout, power supply voltage, and the output signal voltage. Since these detectors perform scanning linearly, no geometrical error correction is required in the electronics readout.

After the cable insulation 20 is extruded onto the conductor 24 the cable 10 motion can deviate appreciably from its ordinary path for some distance out of the extruder head; the deviation being about ± 3/32 inch at a distance of 30 inches from the extruder. This cable motion fluctuation has an overriding effect on the apparent cable size (about plus or minus 18 mils for the largest cables), and must therefore be compensated for accurate size measurements. A mini computer, as will be hereinafter described, is desirably used for correction of this motion. The compensating algorithm, used for this purpose, assumes that a scan is made across the cable in a short amount of time, and that negligible cable motion occurs during the scan. In other words, the geometrical situation prevalent at the time the scan starts is assumed to remain until it ends. The validity of this assumption has proved reasonable in light of the cable velocity during extrusion, and the observed frequency of cable motion. For example, at a 200 feet per minute extrusion rate, using a 1.75 inch outside diameter cable, the cable moves along its line of travel about 0.2184 inches during scanning. With a scanning slit 16, 1 inch in length, this motion is masked out. The following algorithm is set forth as the basis for the exemplary computer program thereafter listed for providing correction of the cable motion.

MOTION COMPENSATING ALGORITHM

Method of Attack:
1. Set up the geometrical situation, and determine angles involved. Then relate all angular quantities to counts obtained from the scanning.
2. Using similar triangles, relate angles and counts to determine the instantaneous cable center.
3. With the center known, determine left insulation thickness (LIT) and right insulation thickness (RIT). From these, determine outside diameter.

In the following equations primed C numbers refer to instantaneous count values. Unprimed numbers refer to fixed counts (such as $C_6$, which never changes) or to long term average counts. Thus, $C_1'$ is the instantaneous $C_1$ count, whereas $C_1$ is the long-term average value for $C_1$.

Figure 5:
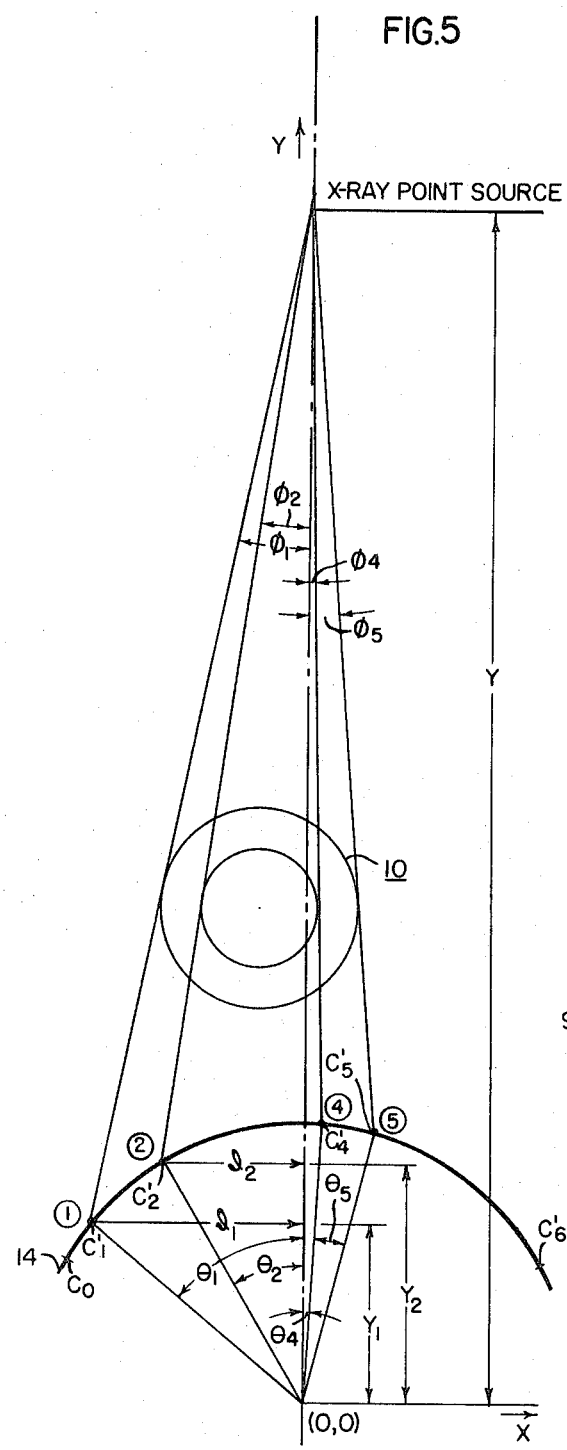
FIG. 5 is a schematic illustration of the X-ray source wave beam illustrating an arithmetic correction to the imaging errors encountered by the detector of this invention and defining the geometric parameters associated with the beam.

Refer to FIG. 5. It is assumed that drum masking is such that the first detectable signal received by the drum 14 occurs at $C_0$ and the last at $C_6$. The counters in the electronics readout system will always be reset at $C_0$; thus $C_6$ is a fixed count, since it is solely determined by mask 32 geometry, not by the cable itself.

If FIG. 5 angles $\theta_1, \theta_2, \theta_4$ and $\theta_5$ (associated with the drum 14) can be directly related to counts, since the drum rotates at a fixed angular velocity $\omega$, and counting occurs at a fixed frequency, $f$. Geometrically, these four angles can be related to the four respective $\phi$ angles, $\phi_1, \phi_2, \phi_4,$ and $\phi_5$.

$$l_1 = r \sin \theta_1 = q \sin \phi_1 \qquad (1)$$

$$\sin \phi_1 = (r/q) \sin \theta_1$$

However, because of cable motion, $q$ is not constant.

$$q = \sqrt{l_1^2 + (Y-y_1)^2} = \sqrt{l_1^2 + y_1^2 + Y^2 - 2y_1 Y} \qquad (2)$$

but $l_1^2 + y_1^2 = r^2$ $$q = \sqrt{r^2 + Y^2 - 2Yr \cos \theta_1} \qquad (3)$$

and $$\sin \phi_1 = \sqrt{r^2 + Y^2 - 2Yr \cos} \; \sin \theta_1$$

$$\sin \phi_1 = \sqrt{r^2 + Y^2 - 2Yr \cos \omega t} \qquad (4)$$

where $t$ is the time required to move from the given point to the centerline (or from the centerline to the given point if we have progressed beyond center).

Generalizing, $$\sin \phi_n = r \sin \omega t_n / \sqrt{r^2 + Y^2 - 2Yr \cos \omega t_n} \qquad (5)$$

Now, let $t_1$ equal the time to rotate from point ① of FIG. 5 to the centerline. In terms of counts, then $$t_1 = C_3 - C_1'/f$$

where $C_1'$ is the instantaneous count at point ①, and $C_3$ is the count at the centerline. This $C_3$ count is not normally available, since no demarkation of signal occurs there. However, because of the mask geometry, $$C_3 = C_6/2 \qquad (6)$$

Thus, for points ① and ②, $$\sin \phi_n = \frac{r \sin \frac{\omega}{f}\left(\frac{C_6}{2} - C_n'\right)}{\sqrt{r^2 + Y^2 - 2Yr \cos \frac{\omega}{f}\left(\frac{C_6}{2} - C_n'\right)}} \qquad (7)$$

$(n = 1, 2)$ and for points ④ and ⑤, $$\sin \phi_m = \frac{r \sin \frac{\omega}{f}\left(C_m' - \frac{C_6}{2}\right)}{\sqrt{r^2 + Y^2 - 2Yr \cos \frac{\omega}{f}\left(C_m' - \frac{C_6}{2}\right)}} \qquad (8)$$

$(m = 4, 5)$

Equations 7 and 8 are basic to the following arguments. We will need the following quantities:

$\sin \phi_2 \qquad \cos \phi_2$
$\sin \phi_4 \qquad \cos \phi_4$

They will now be derived, using equations 7 and 8, plus other material.

First, equations 7 and 8 are not really very convenient for computer solution. Let us rearrange them:

$$\sin \phi = \frac{r \sin \frac{\omega}{f}\left(\frac{C_6}{2} - C_n'\right)}{\sqrt{r^2 + Y^2 - 2Yr \cos \frac{\omega}{f}\left(\frac{C_6}{2} - C_n'\right)}}$$

$$= \frac{r\sqrt{1-\cos^2\frac{\omega}{f}\left(\frac{C_6}{2}-C_n'\right)}}{\sqrt{r^2+Y^2-2Yr\cos\frac{\omega}{f}\left(\frac{C_6}{2}-C_n\right)}}$$

Division by $r$ yields:

$$\sin\phi_n = \sqrt{\frac{1-\cos^2\frac{\omega}{f}\left(\frac{C_6}{2}-C_n'\right)}{1+\left(\frac{Y}{r}\right)^2-2\left(\frac{Y}{r}\right)\cos\frac{\omega}{f}\left(\frac{C_6}{2}-C_n'\right)}} \quad (9)$$

By analogy, then, $$\sin\phi_2 = \sqrt{\frac{1-\cos^2\frac{\omega}{f}\left(\frac{C_6}{2}-C_2'\right)}{1+\left(\frac{Y}{r}\right)^2-2\left(\frac{Y}{r}\right)\cos\frac{\omega}{f}\left(\frac{C_6}{2}-C_2'\right)}} \quad (10)$$

$$\sin\phi_4 = \sqrt{\frac{1-\cos^2\frac{\omega}{f}\left(C_4'-\frac{C_6}{2}\right)}{1+\left(\frac{Y}{r}\right)^2-2\left(\frac{Y}{r}\right)\cos\frac{\omega}{f}\left(C_4'-\frac{C_6}{2}\right)}} \quad (11)$$

These are two of the four trigonometric quantities necessary. Consider the cosine of $\phi_2$ next, from FIG. 5.

$$\cos\phi_2 = \frac{Y-y_2}{\sqrt{(Y-y_2)^2 = l_2^2}}$$

$$= \frac{Y-r\cos\theta_2}{\sqrt{(Y-r\cos\theta_2)^2+(r\sin\theta_2)^2}}$$

$$= \frac{Y-r\cos\theta_2}{\sqrt{Y^2-2Yr\cos\theta_2+r^2\cos^2\theta_2+r^2\sin^2\theta_2}} \quad (12)$$

$$\cos\phi_2 = \frac{\frac{Y}{r}-\cos\theta_2}{\sqrt{\left(\frac{Y}{r}\right)^2+1-2\left(\frac{Y}{r}\right)\cos\theta_2}} \quad (13)$$

Substituting in terms of counts gives:

$$\cos\phi_2 = \frac{\frac{Y}{r}-\cos\frac{\omega}{f}\left(\frac{C_6}{2}-C_2'\right)}{\sqrt{\left(\frac{Y}{r}\right)^2+1-2\left(\frac{Y}{r}\right)\cos\frac{\omega}{f}\left(\frac{C_6}{2}-C_2'\right)}} \quad (14)$$

Similarly, $$\cos\phi_4 = \frac{\frac{Y}{r}-\cos\frac{\omega}{f}\left(C_4'-\frac{C_6}{2}\right)}{\sqrt{\left(\frac{Y}{r}\right)^2+1-2\left(\frac{Y}{r}\right)\cos\frac{\omega}{f}\left(C_4'-\frac{C_6}{2}\right)}} \quad (15)$$

Equations 10, 11, 14, and 15 will be utilized subsequently.

Again refer to FIG. 5. A line through the x-ray source and tangent to the metal part of the cable has a slope:

$$m = Y - Y_2/l_2 = Y - r\cos\theta_2/r\sin\theta_2 \quad (16)$$

Since the vertical intercept of this line is at (O, Y) in the coordinate system shown, the equation for this line is:

$$y = m \times + b = Y - r\cos\theta_2/r\sin\theta_2 \times + Y$$

Figure 6:
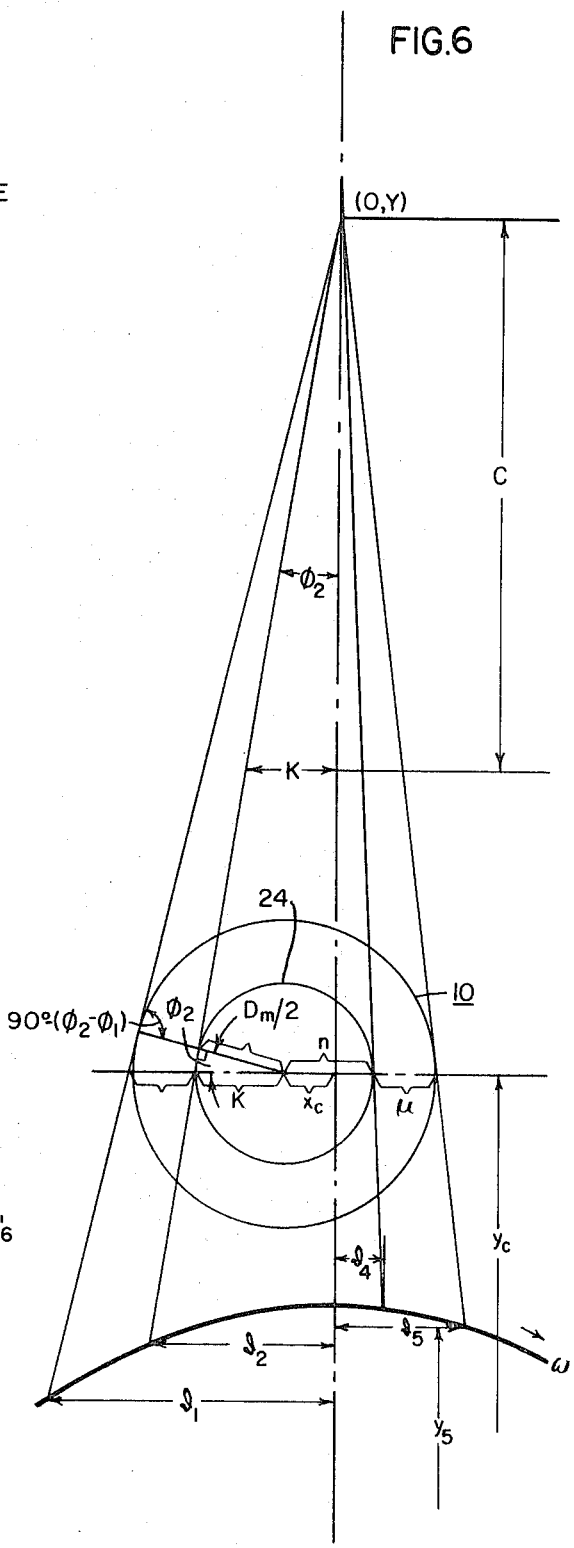
FIG. 6 is a schematic illustration of the X-ray source wave beam illustrating the geometric parameters associated with the cable.

In FIG. 6, using the small triangles, $\cos\phi_2 = (Dm/2)/K; K = Dm/2\cos\phi_2;$ where Dm is the diameter of the conductor 24 (18)

But $K/C = \tan\phi_2$ $C = K/\tan\phi_2 = [(Dm/2\cos\phi_2)/(\sin\phi_2/\cos\phi_2)] = Dm/2\sin\phi_2$ (20)

Now, a line parallel to that of equation 17, and passing through the center of the cable, has the equation:

$$y = [(Y-r\cos\theta_2)/r\sin\theta_2] \times + [Y-(Dm/2\sin\phi_2)]$$

since the slope does not change, and the intercept merely reduces by C. In terms of counts, then, $$y = \left[\frac{Y-r\cos\frac{\omega}{f}\left(\frac{C_6}{2}-C_2'\right)}{r\sin\frac{\omega}{f}\left(\frac{C_6}{2}-C_2'\right)}\right]x+\left(Y-\frac{Dm}{2\sin\phi_2}\right) \quad (22)$$

Similarly, for a line passing through the cable center and parallel to a line tangent to the right side of the metal, the equation is:

$$y = \left[\frac{-Y+r\cos\frac{\omega}{f}\left(C_4'-\frac{C_6}{2}\right)}{r\sin\frac{\omega}{f}\left(C_4'-\frac{C_6}{2}\right)}\right]x+\left(Y-\frac{Dm}{2\sin\phi_4}\right) \quad (23)$$

If equations 22 and 23 are solved simultaneously, the resulting $x$ and $y$ values are the coordinates of the cable center, $(x_c, y_c)$. In order to write down this solution easily, let us digress to matrix theory a moment.

Equations 22 and 23 are of the forms:

$$\left.\begin{array}{l}y_1 = m_1 x_1 + b_1 \\ y_2 = m_2 x_2 + b_2\end{array}\right\} \quad (24)$$

Rearranging:
$$m_1 x_1 - y_1 = -b_1$$
$$m_2 x_2 - y_2 = -b_2$$
(25)

In matrix form, the augmented matrix is:

$$\begin{bmatrix} m_1 & -1 & -b_1 \\ m_2 & -1 & -b_2 \end{bmatrix}$$

which, in step form, is equivalent as follows:

$$\begin{bmatrix} m_1-m_2 & 0 & -b_1+b_2 \\ m_2 & -1 & -b_2 \end{bmatrix} = \begin{bmatrix} 1 & 0 & \frac{-b_1+b_2}{m_1-m_2} \\ m_2 & -1 & -b_2 \end{bmatrix}$$

$$= \begin{bmatrix} 1 & 0 & \frac{-b_1+b_2}{m_1-m_2} \\ 0 & -1 & \frac{-m_2(-b_1+b_2)}{m_1-m_2} - b_2 \end{bmatrix}$$

$$= \begin{bmatrix} 1 & 0 & \frac{-b_1+b_2}{m_1-m_2} \\ 0 & 1 & \frac{m_2(-b_1+b_2)}{m_1-m_2} + b_2 \end{bmatrix} \quad (26)$$

From this,
$$x_c = b_2 - b_1/m_1 - m_2 \quad (27)$$

$$y_c = m_2 x_c + b_2 \quad (28)$$

Substituting from equations 22 and 23:

$$x_c = \frac{Y - \frac{Dm}{2\sin\phi_4} - Y + \frac{Dm}{2\sin\phi_2}}{\frac{\frac{Y}{r} - \cos\frac{\omega}{f}\left(\frac{C_6}{2} - C_2'\right)}{\sin\frac{\omega}{f}\left(\frac{C_6}{2} - C_2'\right)} + \frac{\frac{Y}{r} - \cos\frac{\omega}{f}\left(C_4' - \frac{C_6}{2}\right)}{\sin\frac{\omega}{f}\left(C_4' - \frac{C_6}{2}\right)}}$$

(29)

$$x_c = \frac{\frac{Dm}{2}\left(\frac{1}{\sin\phi_2} - \frac{1}{\sin\phi_4}\right)}{\frac{\frac{Y}{r} - \cos\frac{\omega}{f}\left(\frac{C_6}{2} - C_2'\right)}{\sin\frac{\omega}{f}\left(\frac{C_6}{2} - C_2'\right)} + \frac{\frac{Y}{r} - \cos\frac{\omega}{f}\left(C_4' - \frac{C_6}{2}\right)}{\sin\frac{\omega}{f}\left(C_4' - \frac{C_6}{2}\right)}}$$

(30)

and $$y_c = \left[\frac{\frac{Y}{r} + \cos\frac{\omega}{f}\left(C_4' - \frac{C_6}{2}\right)}{\sin\frac{\omega}{f}\left(C_4' - \frac{C_6}{2}\right)}\right] x_c + \left(Y - \frac{Dm}{2\sin\phi_4}\right)$$

(31)

Referring again to FIG. 6, and from similar triangles, $$l_1/Y - y_1 = p + K + x_c/Y - y_c \quad (32)$$

$$[(Y - y_c) r \sin\theta_1/Y - r\cos\theta_1] - x_c = p + K \quad (33)$$

But $LIT \approx (p + K) \cos\phi_2 - Dm/2 \quad (34)$ $$LIT = \left[\frac{(Y - y_c)r \sin\theta_1}{Y - r\cos\theta_1} - x_c\right] \cos\phi_2 - \frac{Dm}{2} \quad (35)$$

The error in the above approximation is small, less than 0.15 mils maximum. It arises from considering the angle $90° - (\phi_2 - \phi_1)$ as 90°.
Therefore:

$$LIT = \left[\frac{(Y - y_c)r \sin\frac{\omega}{f}\left(\frac{C_6}{2} - C_1'\right)}{Y - r\cos\frac{\omega}{f}\left(\frac{C_6}{2} - C_1'\right)}\right] \cos\phi_2 - \frac{Dm}{2}$$

(36)

and:

$$LIT + \left[\frac{(Y - y_c) \sin\frac{\omega}{f}\left(\frac{C_6}{2} - C_1'\right)}{\frac{Y}{r} - \cos\frac{\omega}{f}\left(\frac{C_6}{2} - C_1'\right)}\right] \cos\phi_2 - \frac{Dm}{2}$$

(37)

Similarly, in FIG. 6,
$$l_5/Y - y_5 = \mu + n - x_c/Y - y_c \quad (38)$$

$$\mu + n = [(Y - y_c) r \sin\theta_5/Y - r\cos\theta_5] + x_c \quad (39)$$

$$(\mu + n) \cos\theta_4 - Dm/2 \approx RIT \quad (40)$$

$$RIT \approx \frac{(Y - y_c)r \sin\frac{\omega}{f}\left(C_5' - \frac{C_6}{2}\right)}{Y - r\cos\frac{\omega}{f}\left(C_5' - \frac{C_6}{2}\right)} - x_c \cos\phi_4 - \frac{Dm}{2}$$

(41)

Again, the approximation arises in a similar manner, but may be ignored. An finally:

$$RIT = \left[\frac{(Y - y_c) \sin\frac{\omega}{f}\left(C_5' - \frac{C_6}{2}\right)}{\left(\frac{Y}{r}\right) - \cos\frac{\omega}{f}\left(C_5' - \frac{C_6}{2}\right)} - x_c\right] \cos\phi_4 - \frac{Dm}{2}$$

(42)

Now,
$$OD + (p + K)\cos\phi_2 + (\mu + n)\cos\phi + RIT + LIT + Dm \quad (43)$$

$$OD + RIT + LIT + Dm \quad (44)$$

Because the foregoing derivation was long and sometimes rather complex, the equations that really result are buried. For this reason, the nine necessary equations are here restated in order of their required solution.

Equation Summary $$\sin\phi_2 = \sqrt{\frac{1-\cos^2\frac{\omega}{f}\left(\frac{C_6}{2}-C_2'\right)}{1+\left(\frac{Y}{r}\right)^2-2\left(\frac{Y}{r}\right)\cos\frac{\omega}{f}\left(\frac{C_6}{2}-C_2'\right)}} \quad (10)$$

$$\sin\phi_4 = \sqrt{\frac{1-\cos^2\frac{\omega}{f}\left(C_4'-\frac{C_6}{2}\right)}{1+\left(\frac{Y}{r}\right)^2-2\left(\frac{Y}{r}\right)\cos\frac{\omega}{f}\left(C_4'-\frac{C_6}{2}\right)}} \quad (11)$$

$$\cos\phi_2 = \frac{\frac{Y}{r}-\cos\theta_2}{\sqrt{\left(\frac{Y}{r}\right)^2+1-2\left(\frac{Y}{r}\right)\cos\theta_2}} \quad (13)$$

$$\cos\phi_4 = \frac{\frac{Y}{r}-\cos\frac{\omega}{f}\left(C_4'-\frac{C_6}{2}\right)}{\sqrt{\left(\frac{Y}{r}\right)^2+1-2\left(\frac{Y}{r}\right)\cos\frac{\omega}{f}\left(C_4'-\frac{C_6}{2}\right)}} \quad (15)$$

$$x_c = \frac{\frac{Dm}{2}\left(\frac{1}{\sin\phi_2}-\frac{1}{\sin\phi_4}\right)}{\frac{\frac{Y}{r}-\cos\frac{\omega}{f}\left(\frac{C_6}{2}-C_2'\right)}{\sin\frac{\omega}{f}\left(\frac{C_6}{2}-C_2'\right)}+\frac{\frac{Y}{r}-\cos\frac{\omega}{f}\left(C_4'-\frac{C_6}{2}\right)}{\sin\frac{\omega}{f}\left(C_4'-\frac{C_6}{2}\right)}} \quad (30)$$

$$y_c = \left[\frac{-\frac{Y}{r}+\cos\frac{\omega}{f}\left(C_4'-\frac{C_6}{2}\right)}{\sin\frac{\omega}{f}\left(C_4'-\frac{C_6}{2}\right)}\right]x_c + \left(Y-\frac{Dm}{2\sin\phi_4}\right) \quad (31)$$

$$LIT + \left[\frac{(Y-y_c)\sin\frac{\omega}{f}\left(\frac{C_6}{2}-C_1'\right)}{\frac{Y}{r}-\cos\frac{\omega}{f}\left(\frac{C_6}{2}-C_1'\right)}\right]\cos\phi_2 - \frac{Dm}{2} \quad (37)$$

$$RIT = \left[\frac{(Y-y_c)\sin\frac{\omega}{f}\left(C_5'-\frac{C_6}{2}\right)}{\left(\frac{Y}{r}\right)-\cos\frac{\omega}{f}\left(C_5'-\frac{C_6}{2}\right)}-x_c\right]\cos\phi_4 - \frac{Dm}{2} \quad (42)$$

$$OD + LIT + RIT + Dm \quad (44)$$

A generalized computer program is set forth below for the equations summarized above. The equations are solved for each axis and the display set up as required. Most of the computer effort must be carried out in double precision to insure that sufficient accuracy is obtained. Most answers are 32 bits in length, and are rounded as required.

The computer takes input counts from each axis and computes the following:
Left insulation thickness (LIT);
Right insulation thickness (RIT);
Bottom insulation thickness (BIT);
Top insulation thickness (TIT);
Average outside diameter (OD);
Average measured insulation thickness; and
Minimum measured insulation thickness.
The algorithm also detects and indicates the following conditions:
Cable OD is too large;
Minimum insulation thickness is too small; and
There is a high cable strand (High-Lay).
The limits for these factors are entered, in this exemplary embodiment, by the use of thumb-wheel switches 40 on the front panel display 52 illustrated in FIG. 7.

Generalized Cable Eccentricity Program

The program to perform the aforementioned algorithm and to convert the counts received in two axes from the X-ray gauge, is herein set forth.

Initially, eleven required constants are inserted into the machine, and remain fixed. These may be inserted in core or read-only memory (ROM). Eight counters, provided in the electronics system to be described hereinafter, containing $C_1'$, $C_4'$, $C_4'$ and $C_5$, from each axis are transferred to the memory upon command. Three parameters, the maximum allowable cable outside diameter, the minimum allowable insulation thickness, and the allowable high-lay variation, are inserted on thumb-wheels 40 hereinbefore described. The foregoing comprises the total requirements prior to computation.

It is assumed that a dual-address machine has been used, but no mnemonic codes are used in specifying operations. Each phase of the computation has been delineated.

Indicators are lighted if the alarm conditions specified by the thumb-wheels 40 are exceeded. At the conclusion of the program the computer stops at location 0100 to await the next input.

PROGRAMMING SETUP

Constants stored initially

| Constant | Location |
|---|---|
| $\omega/f$ | 0001 |
| $Y/r$ | 0002 |
| $(Y/r)^2 + 1$ | 0003 |
| $C_6/2$ | 0004 |
| $Dm/2$ | 0005 |
| $Dm$ | 0006 |
| 1 | 0007 |
| $-1$ | 0008 |
| $Y$ | 0009 |
| $r$ | 0010 |
| 4 | 0011 |

INPUT INFORMATION

Quantities taken from counters:

| | X axis | Y axis |
|---|---|---|
| $C_1'$ | 0020 | 0030 |
| $C_2'$ | 0021 | 0031 |
| $C_4'$ | 0022 | 0032 |
| $C_5'$ | 0023 | 0033 |

Quantities taken from TW's (Thumb Wheels):
Maximum Allowable Outside Diameter — 0024
Minimum Allowable Insulation Thickness — 0025
Allowable High Lay Variation — 0026

CALCULATED QUANTITY STORAGE

| | X | Y |
|---|---|---|
| $\omega/f\,(C_6/2 - C_2')$ | 0601 | 0701 |
| $\cos \omega/f\,(C_6/2 - C_2')$ | 0602 | 0702 |
| $\cos^2 \omega/f\,(C_6/2 - C_2')$ | 0603 | 0703 |
| $\sin \omega/f\,(C_6/2 - C_2')$ | 0604 | 0704 |
| $\omega/f\,(C_4' - C_6/2)$ | 0605 | 0705 |
| $\cos \omega/f\,(C_4' - C_6/2)$ | 0606 | 0706 |
| $\cos^2 \omega/f\,(C_4' - C_6/2)$ | 0607 | 0707 |
| $\sin \omega/f\,(C_4' - C_6/2)$ | 0608 | 0708 |
| $\sin \phi_2$ | 0609 | 0709 |
| $\sin \phi_4$ | 0610 | 0710 |
| $\cos \phi_2$ | 0611 | 0711 |
| $\cos \phi_4$ | 0612 | 0712 |
| $x_c$ | 0613 | 0713 |
| $y_c$ | 0614 | 0714 |
| $\omega/f\,(C_6/2 - C_1')$ | 0615 | 0715 |
| $\cos \omega/f\,(C_6/2 - C_1')$ | 0616 | 0716 |
| $\sin \omega/f\,(C_6/2 - C_1')$ | 0617 | 0717 |
| LIT | 0618 | 0718 |
| $\omega/f\,(C_5' - C_6/2)$ | 0619 | 0719 |
| $\sin \omega/f\,(C_5' - C_6/2)$ | 0620 | 0720 |
| $\cos \omega/f\,(C_5' - C_6/2)$ | 0621 | 0721 |
| RIT | 0622 | 0722 |
| OD (4 value average) | 0623 | |
| Average Measurement Insulation Thickness | 0624 | |
| Minimum Measurement Insulation Thickness | 0625 | |

TEMPORARY STORAGE LOCATIONS

| | X | Y |
|---|---|---|
| $-Y/r \cos \omega/f\,(C_6/2 - C_2')$ | 0801 | 0901 |
| $1 + Y^2/r - 2 Y/r \cos(C_6/2 - C_2')$ | 0802 | 0902 |
| $-Y/r \cos \omega/f\,(C_4' - C_6/2)$ | 0803 | 0903 |
| $1 + Y^2/r - 2 Y/r \cos C_4' - C_6/2$ | 0804 | 0904 |
| $1 + Y^2/r - 2 Y/r \cos C_6/2\, C_2'$ | 0805 | 0905 |
| $\dfrac{Y}{r} \cos \dfrac{\omega}{f}\left(C_4' - \dfrac{C_6}{2}\right)$ <br> $\sin \dfrac{\omega}{f}\left(C_4' - \dfrac{C_6}{2}\right)$ | 0806 | 0906 |
| $\dfrac{\dfrac{Y}{r}\cos\dfrac{\omega}{f}\left(\dfrac{C_6}{2}-C_2'\right)}{\sin\dfrac{\omega}{f}\left(\dfrac{C_6}{2}-C_2'\right)} + \dfrac{\dfrac{Y}{2}\cos\dfrac{\omega}{f}\left(C_4'-\dfrac{C_6}{2}\right)}{\sin\dfrac{\omega}{f}\left(C_4'-\dfrac{C_6}{2}\right)}$ | 0807 | 0907 |
| $1/\sin \phi_2$ | 0808 | 0908 |
| $\left[\dfrac{-\dfrac{Y}{r}+\cos\dfrac{\omega}{f}\left(C_4'-\dfrac{C_6}{2}\right)}{\sin\dfrac{\omega}{f}\left(C_4'-\dfrac{C_6}{2}\right)}\right] x_c + Y$ | 0809 | 0909 |
| $(Y - y_c)$ | 0810 | 0910 |
| $(Y - y_c) \sin \omega/f\,(C_6/2 - C_1')$ | 0811 | 0911 |
| $Y/r - \cos \omega/f\,(C_6/2 - C_1')$ | 0812 | 0912 |
| $(Y - y_c) \sin \omega/f\,(C_5' - C_6/2)$ | 0813 | 0913 |
| $Y/r - \cos \omega/f\,(C_5' - C_6/2)$ | 0814 | 0914 |
| Min of 0618, 0718 | 0815 | |
| Min of 0622, 0722 | 0816 | |
| 4 × Allowable High Lay Variation | 0817 | |
| $C_2' - C_1'$ | 0818 | |

INDICATORS $I_1$ — OD Too Large
$I_2$ — Min Measurement Insulation Thickness Too Small
$I_3$ — High Lay Alarm

CALCULATED QUANTITY STORAGE

| | X | Y |
|---|---|---|
| $\omega/f\,(C_6/2 - C_2')$ | 0601 | 0701 |
| $\cos \omega/f\,(C_62 - C_2')$ | 0602 | 0702 |
| $\cos^2 \omega/f\,(C_6/2 - C_2')$ | 0603 | 0703 |
| $\sin \omega/f\,(C_6/2 - C_2')$ | 0604 | 0704 |
| $\omega/f\,(C_4' - C_6/2)$ | 0605 | 0705 |
| $\cos \omega/f\,(C_4' - C_6/2)$ | 0606 | 0706 |
| $\cos^2 \omega/f\,(C_4' - C_6/2)$ | 0607 | 0707 |
| $\sin \omega/f\,(C_4' - C_6/2)$ | 0608 | 0708 |
| $\sin \phi_2$ | 0609 | 0709 |
| $\sin \phi_4$ | 0610 | 0710 |
| $\cos \phi_2$ | 0611 | 0711 |
| $\cos \phi_4$ | 0612 | 0712 |
| $x_c$ | 0613 | 0713 |
| $y_c$ | 0614 | 0714 |
| $\omega/f\,(C_6/2 - C_1')$ | 0615 | 0715 |
| $\cos \omega/f\,(C_6/2 - C_1')$ | 0616 | 0716 |
| $\sin \omega/f\,(C_6/2 - C_1')$ | 0617 | 0717 |
| LIT | 0618 | 0718 |
| $\omega/f\,(C_5' - C_6/2)$ | 0619 | 0719 |
| $\sin \omega/f\,(C_5' - C_6/2)$ | 0620 | 0720 |
| $\cos \omega/f\,(C_5' - C_6/2)$ | 0621 | 0721 |
| RIT | 0622 | 0722 |
| OD (4 value average) | 0623 | |

Begin Program:

| Statement No. | Action | Action Address | Next Statement |
|---|---|---|---|
| | x Axis Ready | | |
| 0101 | Copy Reg. 1 | 0020 | 0102 |
| 0102 | Copy Reg. 2 | 0021 | 0103 |
| 0103 | Copy Reg. 3 | 0022 | 0104 |
| 0104 | Copy Reg. 4 | 0023 | 0105 |
| | All information from x axis now stored. If y axis was ready, do it as follows: | | |
| 0110 | Copy Reg. 5 | 0030 | 0111 |
| 0111 | Copy Reg. 6 | 0031 | 0112 |
| 0112 | Copy Reg. 7 | 0032 | 0113 |
| 0113 | Copy Reg. 8 | 0033 | 0105 |
| | Ready to Begin Calculations Now | | |

Calculation of factors associated with $\omega/f\,(C_6/2 - C_2')$

| | | | |
|---|---|---|---|
| 0105 | Load Accumulator | 0004 | 0106 |
| 0106 | Subt | 0021(x) 0031(y) | 0107 |
| 0107 | Mult | 0001 | 0108 |
| 0108 | Store | 0601(x) 0701(y) | 0109 |

| Statement No. | Action | Action Address | | Next Statement |
|---|---|---|---|---|
| 0109 | Cos | 0602(x) | 0702(y) | 0120 |
| 0120 | Mult | 0602(x) | 0702(y) | 0121 |
| 0121 | Store | 0603(x) | 0703(y) | 0122 |
| 0122 | Load Accumulator | 0601(x) | 0701(y) | 0123 |
| 0123 | Sin | 0604(x) | 0704(y) | 0124 |

Calculation of factors associated with $\omega/f$ ($C_4' - C_6/2$)

| | | | | |
|---|---|---|---|---|
| 0124 | Load Accumulator | 0024(x) | 0032(y) | 0125 |
| 0125 | Subt | 0004 | | 0126 |
| 0126 | Mult | 0001 | | 0127 |
| 0127 | Store | 0605(x) | 0705(y) | 0128 |
| 0128 | Cos | 0606(x) | 0706(y) | 0129 |
| 0129 | Mult | 0606(x) | 0706(y) | 0130 |
| 0130 | Store | 0607(x) | 0707(y) | 0131 |
| 0131 | Load Accumulator | 0605(x) | 0706(y) | 0132 |
| 0132 | Sin | 0608(x) | 0708(y) | 0133 |

Calculation of Sin $\phi_2$

| | | | | |
|---|---|---|---|---|
| 0133 | Load Accumulator | 0602(x) | 0702(y) | 0134 |
| 0134 | Mult | 0002 | | 0135 |
| 0135 | Mult | 0008 | | 0136 |
| 0136 | Store | 0801(x) | 0901(y) | 0137 |
| 0137 | Add | 0801(x) | 0901(y) | 0138 |
| 0138 | Add | 0003 | | 0139 |
| 0139 | Store | 0802(x) | 0902(y) | 0140 |
| 0140 | Load Accumulator | 0007 | | 0141 |
| 0141 | Subt | 0603(x) | 0703(y) | 0142 |
| 0142 | Div By | 0802(x) | 0902(y) | 0143 |
| 0143 | $\sqrt{Acc}$ | 0609(x) | 0709(y) | 0144 |

Calculation of Sin $\phi_4$

| | | | | |
|---|---|---|---|---|
| 0144 | Load Accumulator | 0605(x) | 0705(y) | 0145 |
| 0145 | Mult | 0002 | | 0146 |
| 0146 | Mult | 0008 | | 0147 |
| 0147 | Store | 0803(x) | 0903(y) | 0148 |
| 0148 | Add | 0803(x) | 0903(y) | 0149 |
| 0149 | Add | 0003 | | 0150 |
| 0150 | Store | 0804(x) | 0904(y) | 0151 |
| 0151 | Load Accumulator | 0007 | | 0152 |
| 0152 | Subt | 0607(x) | 0707(y) | 0153 |
| 0153 | Div By | 0804(x) | 0904(y) | 0154 |
| 0154 | $\sqrt{Acc}$ | 0610(x) | 0710(y) | 0155 |

Calculation Cos $\phi_2$

| | | | | |
|---|---|---|---|---|
| 0155 | Load Accumulator | 0802(x) | 0902(y) | 0156 |
| 0156 | $\sqrt{Acc}$ | 0805(x) | 0905(y) | 0157 |
| 0157 | Load Accumulator | 0002 | | 0158 |
| 0158 | Subt | 0602(x) | 0702(y) | 0159 |
| 0159 | Div By | 0805(x) | 0905(y) | 0160 |
| 0160 | Store | 0611(x) | 0711(y) | 0161 |

Calculation of Cos $\phi_4$

| | | | | |
|---|---|---|---|---|
| 0161 | Load Accumulator | 0804(x) | 0904(y) | 0162 |
| 0162 | $\sqrt{Acc}$ | 0806(x) | 0906(y) | 0163 |
| 0163 | Load Accumulator | 0002 | | 0164 |
| 0164 | Subt | 0606(x) | 0706(y) | 0165 |
| 0165 | Div By | 0806(x) | 0906(y) | 0166 |
| 0166 | Store | 0612(x) | 0712(y) | 0167 |

Calculation of $x_c$

| | | | | |
|---|---|---|---|---|
| 0167 | Load Accumulator | 0002 | | 0168 |
| 0168 | Subt | 0606(x) | 0706(y) | 0169 |
| 0169 | Div By | 0608(x) | 0708(y) | 0170 |
| 0170 | Store | 0806(x) | 0906(y) | 0171 |
| 0171 | Load Accumulator | 0002 | | 0172 |
| 0172 | Subt | 0602(x) | 0702(y) | 0173 |
| 0173 | Div By | 0604(x) | 0704(y) | 0174 |
| 0174 | Add | 0806(x) | 0906(y) | 0175 |
| 0175 | Store | 0807(x) | 0907(y) | 0176 |
| 0176 | Load Accumulator | 0007 | | 0177 |
| 0177 | Div By | 0609(x) | 0709(y) | 0178 |
| 0178 | Store | 0808(x) | 0908(y) | 0179 |
| 0179 | Load Accumulator | 0008 | | 0180 |
| 0180 | Div By | 0610(x) | 0710(y) | 0181 |
| 0181 | Add | 0808(x) | 0908(y) | 0182 |
| 0182 | Mult | 0005 | | 0183 |
| 0183 | Div By | 0807(x) | 0907(y) | 0184 |
| 0184 | Store | 0613(x) | 0713(y) | 0185 |

Calculation of $y_c$

| | | | | |
|---|---|---|---|---|
| 0185 | Mult | 0806(x) | 0906(y) | 0186 |
| 0186 | Mult | 0008 | | 0187 |
| 0187 | Add | 0009 | | 0188 |
| 0188 | Store | 0809(x) | 0909(y) | 0189 |
| 0189 | Load Accumulator | 0008 | | 0190 |
| 0190 | Div By | 0610(x) | 0710(y) | 0191 |
| 0191 | Mult | 0005 | | 0192 |
| 0192 | Add | 0809(x) | 0909(y) | 0193 |
| 0193 | Store | 0614(x) | 0714(y) | 0194 |

Calculation of LIT

| | | | | |
|---|---|---|---|---|
| 0194 | Load Accumulator | 0009 | | 0195 |
| 0195 | Subt | 0614(x) | 0714(y) | 0197 |
| 0197 | Store | 0810(x) | 0910(y) | 0198 |
| 0198 | Load Accumulator | 0004 | | 0199 |
| 0199 | Subt | 0020(x) | 0030(y) | 0200 |
| 0200 | Mult | 0001 | | 0201 |
| 0201 | Store | 0615(x) | 0715(y) | 0202 |
| 0202 | Sin | 0617(x) | 0717(y) | 0203 |
| 0203 | Mult | 0810(x) | 0910(y) | 0204 |
| 0204 | Store | 0811(x) | 0911(y) | 0205 |
| 0205 | Load Accumulator | 0615(x) | 0715(y) | 0206 |
| 0206 | Cos | 0616(x) | 0716(y) | 0207 |
| 0207 | Load Accumulator | 0002 | | 0208 |
| 0208 | Subt | 0616(x) | 0716(y) | 0209 |
| 0209 | Store | 0812(x) | 0912(y) | 0210 |
| 0210 | Load Accumulator | 0811(x) | 0911(y) | 0211 |
| 0211 | Div By | 0812(x) | 0912(y) | 0212 |
| 0212 | Subt | 0613(x) | 0713(y) | 0213 |
| 0213 | Mult | 0611(x) | 0711(y) | 0214 |
| 0214 | Subt | 0005 | | 0215 |
| 0215 | Store | 0618(x) | 0718(y) | 0216 |

Calculation of RIT

| | | | | |
|---|---|---|---|---|
| 0216 | Load Accumulator | 0023(x) | 0033(y) | 0217 |
| 0217 | Subt | 0004 | | 0218 |
| 0218 | Mult | 0001 | | 0219 |
| 0219 | Store | 0619(x) | 0719(y) | 0220 |
| 0220 | Sin | 0620(x) | 0720(y) | 0221 |
| 0221 | Mult | 0810(x) | 0910(y) | 0222 |
| 0222 | Store | 0813(x) | 0913(y) | 0223 |
| 0223 | Load Accumulator | 0619(x) | 0719(y) | 0224 |
| 0224 | Cos | 0621(x) | 0721(y) | 0225 |
| 0225 | Load Accumulator | 0002 | | 0226 |
| 0226 | Subt | 0621(x) | 0721(y) | 0227 |
| 0227 | Store | 0814(x) | 0914(y) | 0228 |
| 0228 | Load Accumulator | 0813(x) | 0913(y) | 0229 |
| 0229 | Div By | 0814(x) | 0914(y) | 0230 |
| 0230 | Subt | 0613(x) | 0713(y) | 0231 |
| 0231 | Mult | 0612(x) | 0712(y) | 0232 |
| 0232 | Subt | 0005 | | 0233 |
| 0233 | Store | 0622 | 0722(y) | 0234 |

Calculation of Outside Diameter

| | | | | |
|---|---|---|---|---|
| 0234 | Load Accumulator | 0622 | | 0235 |
| 0235 | Add | 0722 | | 0236 |
| 0236 | Add | 0618 | | 0237 |
| 0237 | Add | 0718 | | 0238 |
| 0238 | Add | 0006 | | 0239 |
| 0239 | Add | 0006 | | 0240 |
| 0240 | Div By | 0011 | | 0241 |
| 0241 | Subt | 0024 | | 0242 |
| 0242 | Test for Neg | 0243 | | 0244 |
| | | (pos test) | | (neg test) |
| 0244 | Store for Ind | $I_1$ | | 0243 |
| 0243 | Add | 0024 | | 0245 |
| 0245 | Store | 0623 | | 0246 |

Calculation of Average & Minimum Measured Insulation Thickness

| | | | | |
|---|---|---|---|---|
| 0246 | Load Accumulator | 0622 | | 0247 |
| 0247 | Add | 0722 | | 0248 |
| 0248 | Add | 0618 | | 0249 |
| 0249 | Add | 0718 | | 0250 |
| 0250 | Div By | 0011 | | 0251 |
| 0251 | Store | 0624 | | 0252 |
| 0252 | Load Accumulator | 0618 | | 0253 |
| 0253 | Subt | 0718 | | 0254 |
| 0254 | Test for Neg or 0 | 0255 | | 0256 |
| | | (pos test) | | (neg test) |
| 0255 | Load Accumulator | 0618 | | 0257 |
| 0256 | Load Accumulator | 0718 | | 0257 |
| 0257 | Store | 0815 | | 0258 |
| 0258 | Load Accumulator | 0622 | | 0259 |
| 0259 | Subt | 0722 | | 0260 |
| 0260 | Test for Neg or 0 | 0261 | | 0262 |
| | | (pos test) | | (neg test) |
| 0261 | Load Accumulator | 0622 | | 0263 |
| 0262 | Load Accumulator | 0722 | | 0263 |
| 0263 | Store | 0816 | | 0264 |
| 0264 | Subt | 0815 | | 0265 |
| 0265 | Test for Neg or 0 | 0266 | | 0267 |
| | | (pos test) | | (neg test) |
| 0266 | Load Accumulator | 0816 | | 0268 |
| 0267 | Load Accumulator | 0815 | | 0268 |
| 0268 | Store | 0625 | | 0269 |
| 0269 | Subt | 0025 | | 0270 |
| 0270 | Test for Neg | 0271 | | 0272 |
| | | (pos test) | | (neg test) |
| 0271 | Store for Ind | $I_2$ | | 0272 |

High Lay Test

| | | | | |
|---|---|---|---|---|
| 0272 | Load Accumulator | 0026 | | 0273 |
| 0273 | Mult By | 0011 | | 0274 |
| 0274 | Store | 0817 | | 0275 |
| 0275 | Load Accumulator | 0021 | | 0276 |
| 0276 | Subt | 0020 | | 0277 |
| 0277 | Store | 0818 | | 0278 |
| 0278 | Load Accumulator | 0624 | | 0279 |
| 0279 | Subt | 0818 | | 0280 |
| 0280 | Subt | 0817 | | 0281 |
| 0281 | Test for Neg | 0282 | | 0283 |
| | | (pos test) | | (neg test) |
| 0282 | Stop | | | 0100 |
| 0283 | Store for Ind | $I_3$ | | 0282 |

The computer specifications required to process the aforedescribed program are as follows:
- Word Length — 16 bits
- Memory Cycle Time — ≈1 $\mu$sec.
- Add Time — <2 $\mu$sec.
- Memory Size — 1K Words (16 bits) (plus program requirements)
- Input Registers — 8 + 3 Thumbwheel Inputs Features:

Wide range of routines or hardware devices, including Sin and Cos trig functions, square root, multiply and divide.

The Lockheed MAC-Jr. and the SuperNova mini computer are two examples of computers which satisfy the aforementioned requirements and may be used in this exemplary embodiment.

In computing the equation summary hereinbefore set forth, plus handling all alarm functions (including highlay), averages, and the minimums required, a total of 288 operations are performed by the computer as shown in the following table.

Computational Requirements for Algorithm

| Operation | Number of Times Performed |
|---|---|
| Copy Input Register | 8 |
| Load Accumulator | 67 |
| Add | 25 |
| Subtract | 44 |
| Muliply | 39 |
| Divide | 27 |
| Square Root | 4 |
| Test and Branch | 6 |
| Store | 57 |
| Store for Indication | 3 |
| Trigonometric Functions | 8 |
| Total | 288 |

Storage requirements are 355 sixteen-bit words. Assuming that double precision arithmetic is required for half of the calculated operations, approximately 16 milliseconds are required to perform the algorithm for each axis. In addition, some time must be provided for housekeeping chores such as shifting, rounding off, and others. Thus, a fairly large safety margin is desirable. One computation each for the two axes will require about 100 to 150 milliseconds. This is too long to permit a computation each time a slit 16 passes. Averaging the counts from twelve slits on each axis is more desirable, permitting the algorithm to be solved easily and providing sufficient output detail. If averaging is utilized, provision must be made for the high-lay detection. If ten or twelve slits are averaged, any high-lay would be lost in the process unless all averaging is done within the computer rather than counters prior to computer entry.

The algorithm hereinbefore provided is written wherein computation is performed with the counts obtained from each single slit 16. If averaging is desired, a slight modification to the program provided hereinbefore will be required. Such a modification is well within the knowledge of those skilled in the programming art and is therefore not provided.

The successful computation of the algorithm is not highly dependent upon the computer chosen; most computers on the market that are classed as mini computers will perform the algorithm in the 12-slit available time. If a slower computer is desirable for a specific application, such as where each slit is to be considered individually, the alternative of collecting data, and then computing while not collecting data, then collecting data again, is always available.

READOUT ELECTRONICS FOR THE COMPUTER INPUT

Figure 8:
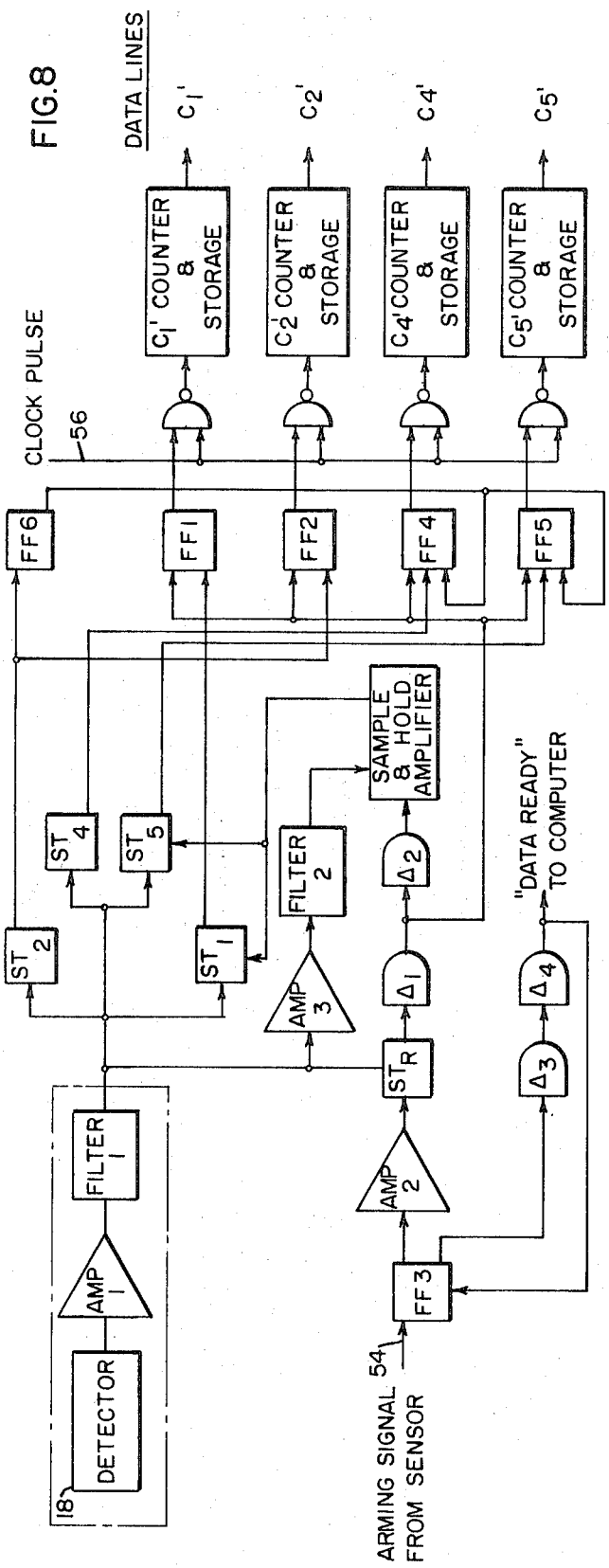
FIG. 8 is a simplified block diagram illustrating one embodiment of readout system electronics of this invention.

In this exemplary embodiment, scanning is performed across the cable at a rate of 40 scans per second, or one scan each 5 linear cable inches at the normal 1,000 foot per minute extrusion rate. Since eccentricity is a long term effect, increasing relatively slowly, such a scanning rate will adequately survey the problem. Because of the conductor wrapping of the cable, definite high and low points exist in the cable insulation thickness. All layers or wire except the center conductor are twisted to achieve flexibility and stress relief in most coated cables. A single strand makes a 360° traverse around the cable in about 13 times the metal diameter. These cable lay variations have proved to produce negligible errors, however, where averaging is utilized in the computer, these lay variations are averaged out. But simultaneously, the non-averaged signal is used to detect high-lays or strands. An exemplary scanning situation has previously been described hereinbefore with reference to FIGS. 1 and 3. FIG. 8 illustrates, in block diagram form, an exemplary electronics hardware package used to translate the electronic scanning signals into meaningful values for use as the inputs $C_1'$, $C_2'$, $C_4'$ and $C_5'$ to the computer.

The left/right insulation thickness circuit is described hereinafter. It should be remembered that the upper/lower thickness system is identical and the same system description applies to both.

Referring now to FIG. 8, it will be observed that an arming signal 54 initiates action just prior to a slits entrance into the X-ray beam. This arming signal 54 emanates from a detector 58 positioned within the drum 14 as illustrated in FIG. 1 and causes FF3 to set. The detector 58, which can be a photocell or a magnetic detector responds to a polished spot or magnetic strip, respectively, provided on the interior of the drum surface just forward of the slit 16 and signals the commencement of a scanning cycle. Although not specifically shown, the setting of FF3 causes resetting of the following: FF1, FF2, FF4, FF5, FF6, $C_1'$ storage, $C_2'$ storage, $C_4'$ storage and $C_5'$ storage.

Setting of FF3 arms the Schmitt trigger used for reference, $ST_R$. By the action of amplifier 2, this Schmitt trigger has been off-biased so as to inhibit comparison. This bias is removed when FF3 is set. Thus, $ST_R$ is biased to "fire" at about half signal from the X-ray detector. As the signal increases at the mask edge 32, $ST_R$ does fire, activating delay $\Delta_1$ and activating delay $\Delta_2$ at the conclusion of $\Delta_1$'s delay period. $\Delta_2$ is set for approximately the minimum tracking period of the sample-and-hold amplifier (the settling time), and the sample-and-hold amplifier tracks the input signal (filtered) during this time. The purpose of amplifier 3 is to isolate the detector signal sent to the sample-and-hold amplifier from that going to the Schmitt triggers. This permits additional filtering of the signal from which the sample-and-hold amplifier obtains its output. The additional filtering is provided by filter 2. Essentially, this permits a much smoother signal to enter the sample-and-hold amplifier and makes it less likely that the amplifier output would be a signal obtained from a noise peak.

At the conclusion of the $\Delta_1$ delay, flip-flops FF1, FF2, FF4 and FF5 are set, enabling counting in the $C_1'$, $C_2'$, $C_4'$ and $C_5'$ counter-storage units respectively. To obtain proper output, it is only necessary to turn these same flip-flops off at the proper time.

Figure 9:
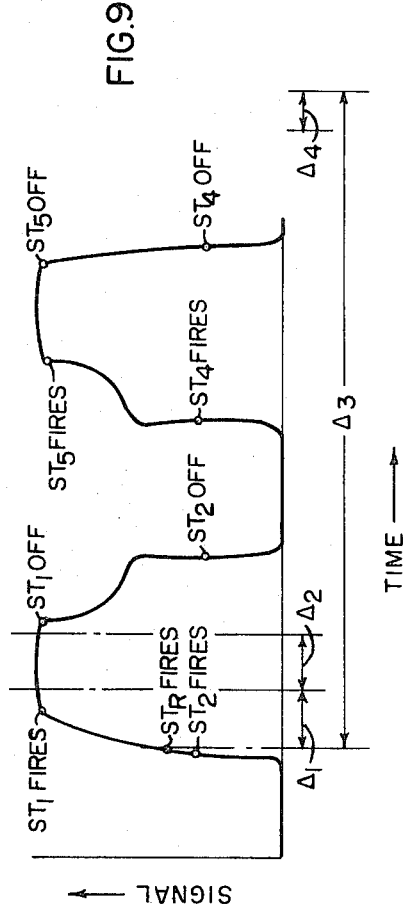
FIG. 9 is a graphical illustration of the readout system timing.

FF1 is reset when $ST_1$ goes off, as shown on the waveform sketch provided in FIG. 9. Thus, counter $C_1'$ is activated at the conclusion of the $\Delta_1$ delay and is turned off when the insulation 20 is sensed.

FF2 is reset when $ST_2$ goes off. Thus it contains counts beginning with the conclusion of the $\Delta_1$ delay and ending when the metal conductor 24 is sensed. When $ST_2$ goes off, flip-flop FF6 is set, enabling FF4 and FF5 for future resetting.

FF4 is reset when $ST_4$ fires. Thus counter $C_4'$ is activated at the conclusion of the $\Delta_1$ delay and ceases counting when entrance into the right insulation is sensed.

FF5 is reset when $ST_5$ fires, and thus contains a count representative of the time from the end of the $\Delta_1$ delay to the point at which the end of the cable is sensed.

The clock signal 56 to the counters is nominally 983.04 KHz. This frequency is not critical but must be known. The computer will translate this frequency into mils insulation thickness regardless of its specific value. The choice of 983.04 KHz is chosen to provide a a sufficiently high frequency to yield good counting statistics, while being a convenient direct binary multiple of 60 Hz. Thus, countdown of this signal by $2^{14}$ will yield a frequency usable by the drum drive motor 34 in case drum drive needs to be locked to the counting frequency. The only reason for such a lock is to accommodate line frequency changes at the point of application. If the power company furnishing power at the point of application can assure that frequency is constant to within about 0.2 Hz at all times, such an oscillator countdown is not required.

Figure 7:
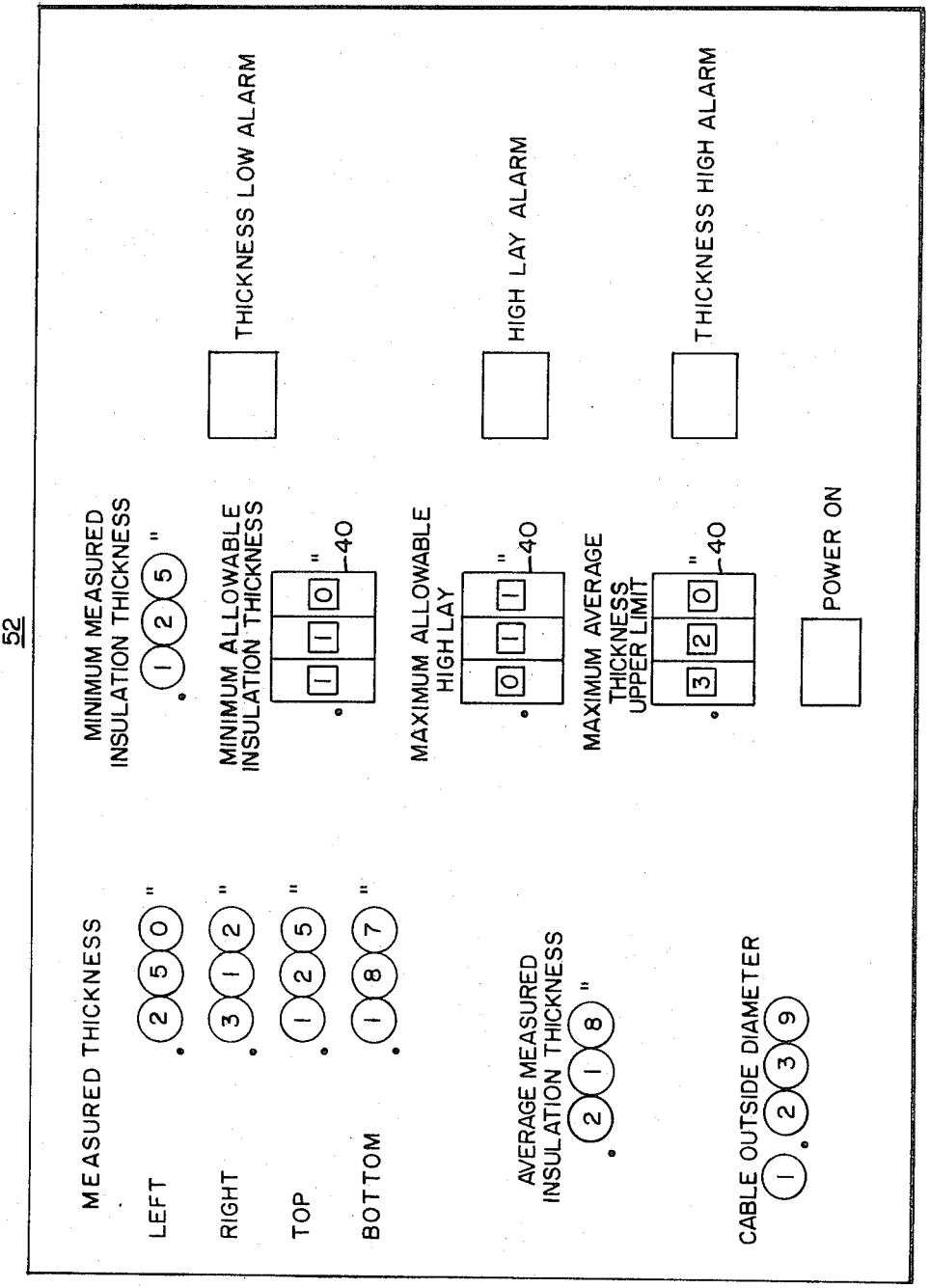
FIG. 7 is a schematic diagram of the front panel display of the readout system of this invention.

At the time of activation of FF3, the $\Delta_3$ delay is activated, and produces a delay a little longer than the scan time across the cable. The $\Delta_4$ delay then produces a pulse to the computer to indicate that the data is ready.

Where averaging of the scans is utilized, as previously mentioned, special provision has to be provided to determine a high-lay detection. Essentially, a high strand results in a decrease in the time from $ST_1$ shutoff to $ST_2$ shutoff. After some slight history is built up in the computer, the difference $C_2'-C_1'$ will be known closely. If ever this decreases appreciably, it would be due to a high-lay fault. High-lay detection, then, is reduced to a consideration of this count once each slot by the computer. Some amount of high-lay is tolerable. Thus, a thumbwheel switch 40 on the front panel, as illustrated in FIG. 7, is provided and allows the operator to indicate how much high-lay is to be ignored. The range of the switch provided in this exemplary embodiment is from 2 mils to 99 mils.

From the electronics data lines, $C_1'$, $C_2'$, $C_4'$ and $C_5'$ the computer calculates (according to the algorithm hereinbefore provided) left insulation thickness, right insulation thickness, bottom insulation thickness, top insulation thickness, outside diameter, average measured insulation thickness, and minimum measured insulation thickness. If the minimum measured insulation thickness drops below the minimum set on the front panel thumbwheel switches, an alarm is activated. Additionally, although not as critical, the alarm is activated when the average measured insulation thickness exceeds the number set on the thumbwheel switches, indicating that too much insulation is being applied.

The upper/lower insulation thickness hardware works identically with the left/right. After scanning of the left/right insulation is complete, FF3 is reset, which blocks the left/right counters.

Where no correction for cable motion is required, an alternate embodiment to the readout electronics can be employed which does not require the aid of a computer. Such an embodiment is set forth below as exemplary of a readout electronics system which can be employed to practice this invention.

The scanning rate illustrated as being exemplary of this invention has been described as 40 scans per second, or one scan each 5 linear cable inches at 1000 feet per minute extrusion rate. Since eccentricity is a long-term affect, increasing relatively slowly, the exemplary scanning rate should adequately survey the problem.

Because of the wrapping of the cable, as previously described, definite high and low points exist in cable insulation thickness. These cable lay variations are averaged out in the readout electronics by integrating (digitally) over a number of scans and dividing the answer. But simultaneously the non-integrated signal is used to detect high lays or strands.

Figure 10:
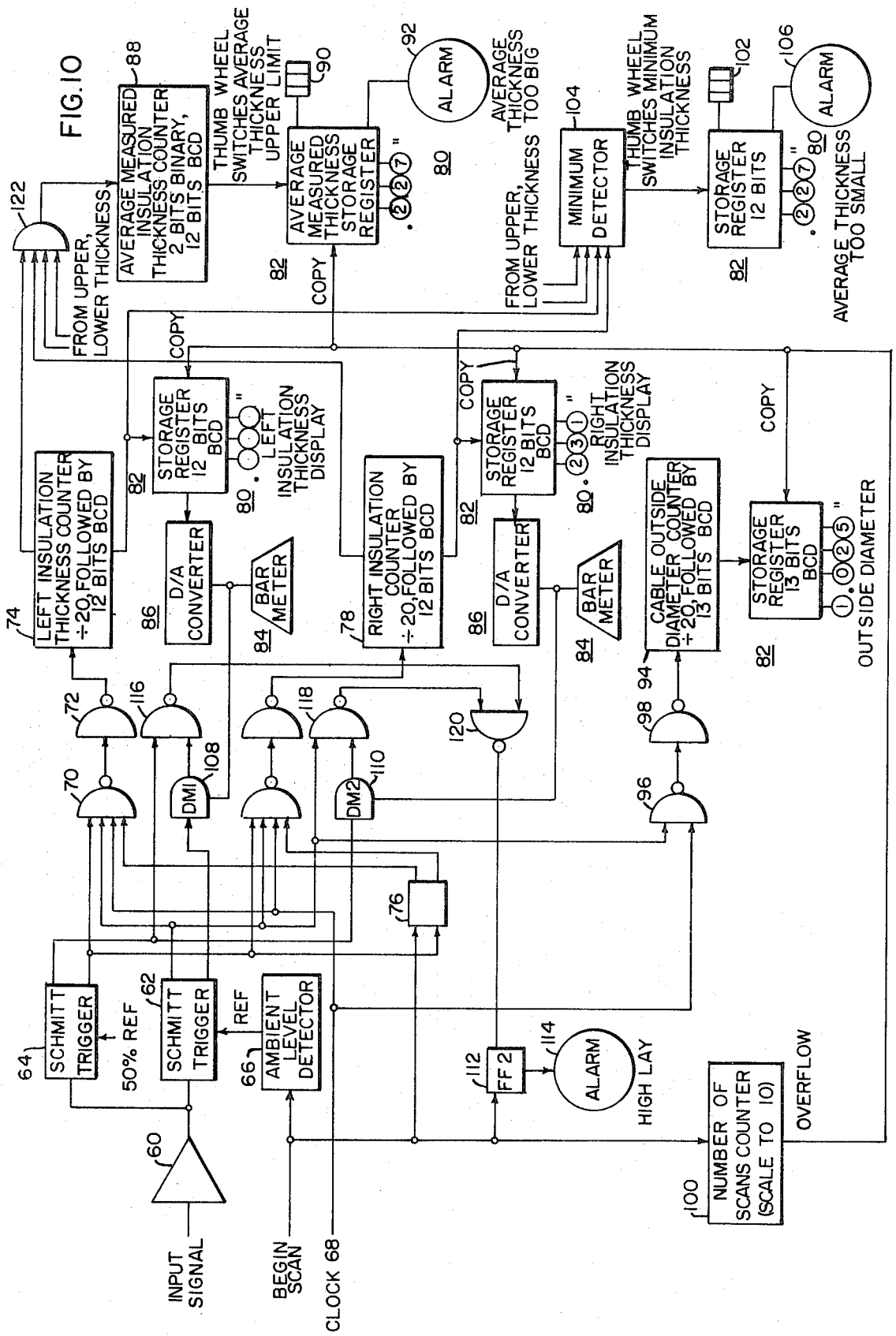
FIG. 10 is a simplified block diagram illustrating another embodiment of the readout system electronics of this invention.

FIG. 10 illustrates the block diagram of the electronic hardware used in this illustration to translate the electronic scanning signals into meaningful values of insulation thickness.

The left/right insulation thickness circuit is described. It should be remembered that the upper/lower thickness system is nearly identical, and the same system description applies to it. Slight differences are pointed out in the description.

The input signal from the detector and photomultiplier is amplified by the input amplifier 60, providing isolation, low driving impedance, and improved signal-to-noise ratio for the input to the two Schmitt trigger circuits 62 and 64.

Figure 11:
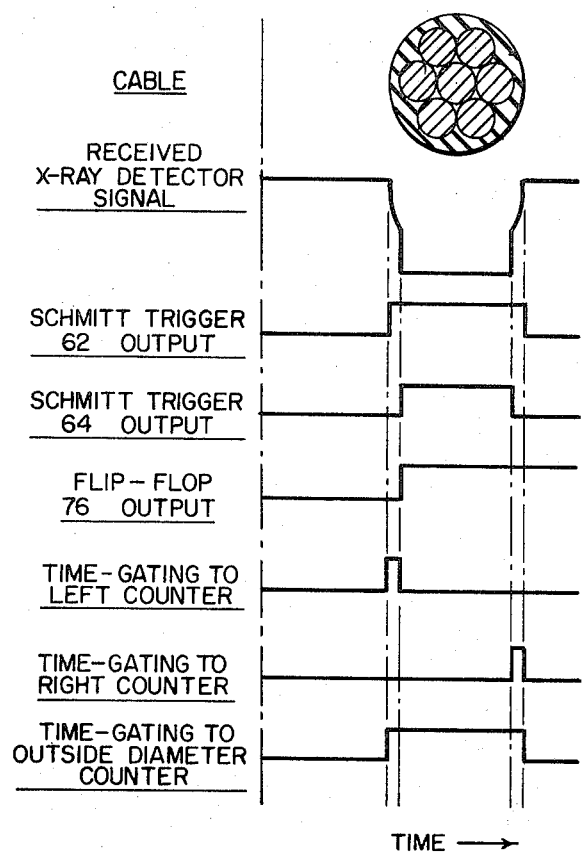
FIG. 11 is a graphical illustration of the waveform analysis of the system of FIG. 10.

The ambient level detector 66 determines the imaging output near the beginning of each scan, and uses this signal to set the reference point of Schmitt trigger 62. When the amplified input signal indicates that the signal level has dropped appreciably (0.2 to 0.3 volts) from the ambient reference, Schmitt trigger 62 will transition and remain "on" until the signal again drops close to the reference level. Thus, Schmitt trigger 62 is on for a period of time equal to that required to scan across the entire outside diameter of the cable as illustrated in FIG. 11.

Schmitt trigger 64 is referenced at about 50 percent of the detector signal range. Thus, when the X-rays are stopped by the conductor and the input signal drops, Schmitt trigger 64 comes on. Therefore, during the interval between the time that Schmitt triggers 62 and 64 come on, the left side of the insulation is scanned, and signals from the clock 68 are gated by gates 70 and 72 to the left insulation thickness counter 74.

When Schmitt trigger 64 fires, it turns flip-flop 76 on as well, which disables the left side counting hardware. When Schmitt trigger 64 goes off, and until Schmitt trigger 62 also goes off, the right insulation thickness counter 78 is operative.

It is necessary to average out signal variations due to cable lay. This is done easily by averaging the readings over a considerable period of time in the electronics. For example, if it is desired to average a signal over 10 readings, each reading is permitted to accumulate in a counter (thereby totalizing the readings) and the answer is divided by 10.

Due to signal averaging, the accuracy is improved because of statistical considerations. If, for example, readings are averaged over 10 scans, an improvement in statistical accuracy of $\sqrt{10} = 3.16$ over the accuracy of any single reading will be obtained.

In the counting circuits, a clock rate of 600 KHz is used, with the rotating drums 14 phase-locked to the clock 68. Assuming the scan to be 2-½ inches in length, and having a desired readout of 1 mil, at least 2500 counts enter during the scan period of 8.32 milliseconds. The clock rate must then be 300 KHz minimum. A value twice this amount is used in this illustration to improve the last digit accuracy. The above calculation refers to a situation with no magnification and parallel X-rays. To reduce the count to compensate for magnification, a clock rate of 515 KHz can be used.

A readout display 80 changing at a rate of no more than four times per second can adequately be absorbed by a viewer. During one-fourth second, 10 scans are made, at an effective counting rate of 600 KHz, twice the required count rate, however, no flicker will be evident in the display, due to the separate storage register 82 used as a buffer. A division by 20 can be employed to both average the 10 readings and to compensate for the increased count rate.

Referring to the system of FIG. 10, an illustration of the systems operation will be given to further clarify the last paragraph. Consider only the left insulation thickness measurement, although the same considerations apply to other measurements as well. The thickness is measured and summed 10 times in the left insulation thickness counter 74, which has been made extra large (by a factor of 20) for just this purpose, and to compensate for the doubled counting rate. The contents of this counter are then divided by 20. Division is very simply performed by moving the decimal point, just as it is simple to divide by 10 in decimal arithmetic. The divided answer, found by setting the binary decimal point 1 binary bit plus four binary coded decimal (BCD) bits left, is then transferred to the storage register 82. The first five bits of the counter 74 constitute a scale-of-20 divider, making this division easy. The remaining bits are binary-coded-decimal, because of the ease in reading decimal numbers directly. Thus, the displays 80 all read out in mils directly.

A digital-to-analog (D/A) converter 86 changes the contents of the storage register 80 to an analog signal, which can then be indicated on a bar meter 84. These meters are so constructed that they appear as a line on a bar chart, quickly serving to provide a rapid comparison between quantities. The left and right bar meters should be mounted one immediately above the other for convenience.

The right insulation thickness hardware works in the manner as the left, except for one small variation. After scanning of the left insulation is complete, flip-flop 76 is set, which blocks the left counter 74 and enables the right side circuitry. This situation is reversed (reset) at the beginning of the next scan.

It is desirable to display the average measured insulation thickness, which is the average of the left, right, upper, and lower thicknesses as read. Outputs are taken from each of the four thickness counters representative of the above measurements (after the divide-by-20 portions) and are gated by gate 122 and summed in another counter 88. Because of the geometry, none of the output signals occur simultaneously. The sum is divided by four by moving the binary decimal point two places, and the average displayed in a similar manner. This display should aid the operator greatly in reducing unnecessary extra insulation. A set of thumbwheel switches 90 control the upper limit of average measured insulation thickness. If the average exceeds the limit, an alarm 92 alerts the operator to permit die correction.

During the on period of Schmitt trigger 62, clock signals from the clock 68 enter the cable outside-diameter counter 94 and register 82 through gates 96 and 98. Again, the reading is taken over 10 scans at a double counting rate, and the results divided by 20 by decimal shifting. The displayed contents capability of this counter must be one bit larger, since it must be able to go to 1,999 inch, rather than 0.999 inch as in the case of the insulation thickness counters.

With the beginning of each scan, the contents of the "number of scans" counter 100 is increased by one. This device, upon overflow, indicates that 10 scans have accrued, and causes each storage register 82 to copy the respective counter's contents for display. Only one "number of scans" counter 100 is necessary, since no separate unit would be required for the upper and lower thickness circuitry.

A set of thumbwheel switches 102, marked "minimum allowable average measured thickness" sets the lower limit for this variable. A minimum value detector 104 determines if left, right, upper, ow lower thickness is the minimum, and gates the value into a storage register. Comparison is made with the set minimum, and an alarm 106 is triggered if the detected value is lower than a predetermined minimum.

For "high lay" detection, delay modules 108 and 110 are used. These units are emitter-coupled monostable multivibrators which are referenced by external voltages supplied at the output of the D/A converters 86. Now, these reference voltages produce linear delays in the two delay units 108 and 110. Thus, a delay period barely sufficient to traverse the left insulation is given by 108 upon triggering; 110 does the same for the right insulation. Triggering is accomplished (using negative waveform edges) for 108 by the initial firing of Schmitt trigger 62, whereas 110 is triggered when Schmitt trigger 64 goes off. The gating arrangement 116, 118 and 120 is such that, if the delay period of 108 has not ended but Schmitt trigger 64 has come on, the "high lay" flip-flop 112 is set, and the operator sees the alarm 114. Similarly, if the delay period of 110 has ended before Schmitt trigger 62 goes off, the flip-flop 112 is set also. It is evident that a "high lay" will increase the effective conductor width as seen by the X-rays on one or both sides of the cable. Thus, the lay detector alarms under these conditions.

All the components of the exemplary readout systems just described can be constructed out of solid-state integrated circuit hardware. All such components, as labeled, are well known and within the knowledge of those skilled in the electrical art. Therefore, individual circuitry diagrams have not been provided for these components.

Thus, in accordance with this invention, a nondestructive insulated cable insulation thickness and eccentricity gaging system using X-rays and one-dimensional X-ray imaging combined with a digital data processing and readout system is provided which can be installed on insulated cable production lines to enable rapid process correction and control capability on the insulation extrusion process.

We claim as our invention:

1. A cable measurement system comprising:
   at least one X-ray source for radiating a beam of X-rays directly towards one side of the cable being measured, said source being positioned at a fixed spaced location from the cable;
   at least one scanner for continuously laterally scanning the cable in one direction on the side opposite that side of the cable irradiated by said X-ray source and transmitting received X-rays intercepted thereby;
   a detector optically coupled to said scanner for detecting the X-rays intercepted by said scanner, said detector having an electrical analog output proportional to the intensity of the X-rays detected; and
   an electronic readout electrically coupled to said detector output for converting said detector output into cable measurements.

2. The apparatus of claim 1 wherein said scanner comprises:
   an X-ray opaque rotating drum having at least one slit on the circumference of said drum;
   said drum slit running substantially parallel with the axis of revolution of said drum; and
   said drum rotating on its axis of revolution parallel with the cable axis so that said slit scans the cable substantially perpendicular to the cable axis.

3. The apparatus of claim 1 wherein said scanner comprises:
   an X-ray opaque revolving disc revolving on an axis substantially perpendicular to and intersecting the cable axis, said disc having at least one radial slit positioned on the surface of revolution thereof; and
   a stationary X-ray opaque plate positioned substantially adjacent and parallel to said revolving disc and sized to mask the radial slit in said disc, said plate having a slit extending at least the width of the cable and positioned on its surface substantially perpendicular to and centered about the cable axis, the slit in said plate being coincident with at least a portion of the radial slit in said disc as said slit in said disc rotates across the cable.

4. The apparatus of claim 3 wherein the slit in said stationary plate is curved in an arc, the slit arc in said plate having a curvature substantially equal and opposite to the curvature traced by a point positioned substantially at the center of the radial slit in said disc as the slit in said disc rotates across said cable and intersecting the traced arc at the cable boundaries so that as the slit in said disc rotates across the curved slit in said stationary plate X-rays will pass through the opening common to both slits thereby scanning successive elements of the cable cross-section.

5. The apparatus of claim 1 wherein said detector comprises:
   a photomultiplier; and
   a scintillation crystal optically coupled to said photomultiplier.

6. The apparatus of claim 1 including an X-ray transparent cable jacket positioned generally around the cable and isolating each of said source, said scanner and said detector from the environment surrounding the cable.

7. The apparatus of claim 6 wherein said jacket is at least partially constructed out of an X-ray transparent material selected from the group consisting of beryllium, aluminum, boron and graphite.

8. The apparatus of claim 1 wherein said scanner and said detector comprise an X-ray sensitive television scanner-detector system.

9. The apparatus of claim 1 wherein said scanner and said detector comprise a photodiode array.

10. The apparatus of claim 1 wherein said electronic readout comprises:
    electrical means for converting said analog detector output into at least one digital count representative of at least an increment of the scanning cycle;
    a digital computer having an input representative of said count; and
    means for operating said computer to determine the cable measurements from said count.

11. The apparatus of claim 10 wherein said electrical means converts said analog detector output into four digital counts representative of four increments of the scanning cycle, each increment commencing with the point of scan wherein said detector first senses the X-rays from said source, the first increment ending wherein said detector first senses the cable insulation, the second increment ending wherein said detector first senses the cable conductor, the third increment ending wherein said detector first senses the insulation after the conductor and the fourth increment ending wherein said detector first senses the end of the cable.

12. The apparatus of claim 10 wherein:
    said computer has at least one manual input for inserting cable measurement limits; and
    said means for operating said computer sounds an alarm when the cable measurement limits are exceeded.

13. The apparatus of claim 10 wherein said means for operating said computer compensates for any lateral motion of the portion of the cable being scanned.

14. The apparatus of claim 1 wherein said electronic readout comprises circuitry means for converting said detector output into at least one digital count representative of at least one cable measurement.

15. The apparatus of claim 14 wherein said circuitry means converts said detector output into a plurality of digital counts representative of the cable insulation thickness, outside diameter, average measured insulation thickness and minimum measured insulation thickness.

16. The apparatus of claim 14 wherein said circuitry means sounds an alarm when said count exceeds a preset value.

17. The apparatus of claim 1 including means for moving the cable past said X-ray source and said scanner so that said scanner performs successive scans on consecutive segments of cable.

18. The apparatus of claim 1 wherein:
    a pair of X-ray sources are positioned along orthogonal axes so as to irradiate two adjacent sides of the cable being measured; and wherein
    one of said scanners is associated with each of said X-ray sources so as to scan the cable on the side opposite the side of the cable irradiated by said corresponding X-ray source.

19. The apparatus of claim 18 wherein said scanners scan orthogonal sides of the cable successively.

20. A method for making cable measurements comprising the steps of:
irradiating at least one side of a cable with a beam of X-rays from a source located at a fixed spaced location from the cable;
continuously laterally scanning the side opposite the side of the cable being irradiated in one direction so as to intercept X-rays transmitted through the cable;
detecting the intensity of the intercepted X-rays transmitted through the cable;
converting the detected X-ray intensity into a proportional electrical signal; and
electrically converting said electrical signal into cable measurements.

21. The method of claim 20 wherein said scanning is repeated successively and including the step of moving the cable along its axis past said X-rays.

22. The method of claim 20 wherein said irradiating step is performed on two orthogonal sides of the cable and said scanning is performed on the sides of the cable opposite the sides being irradiated so as to produce two dimensional cable measurements.

23. The method of claim 22 wherein the scanning in one dimension is performed successively with the scanning in the other dimension.

24. The method of claim 20 wherein said converting step includes the step of electrically compensating said electrical signal for errors induced by any cable motion.

* * * * *